(12) United States Patent
Sakuma

(10) Patent No.: US 11,018,718 B1
(45) Date of Patent: May 25, 2021

(54) WIRELESS COMMUNICATION DEVICE AND WIRELESS COMMUNICATION METHOD

(71) Applicant: Fujikura Ltd., Tokyo (JP)

(72) Inventor: Ken Sakuma, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 16/864,307

(22) Filed: May 1, 2020

(51) Int. Cl.
| | | |
|---|---|---|
| *H04B 3/52* | (2006.01) | |
| *H04B 7/06* | (2006.01) | |
| *H04W 24/02* | (2009.01) | |
| *H04B 3/54* | (2006.01) | |

(52) U.S. Cl.
CPC ............... *H04B 3/52* (2013.01); *H04B 3/54* (2013.01); *H04B 7/0617* (2013.01); *H04W 24/02* (2013.01)

(58) Field of Classification Search
CPC .......... H04B 3/52; H04B 3/54; H04B 7/0617; H04W 24/02
USPC ...................................................... 455/562.1
See application file for complete search history.

(56) References Cited

U.S. PATENT DOCUMENTS

| | | | |
|---|---|---|---|
| 9,001,803 B2 * | 4/2015 | Bollea ................. | H01Q 3/2605 370/338 |
| 9,960,877 B2 | 5/2018 | Cordeiro et al. | |
| 10,141,993 B2 * | 11/2018 | Lee ........................ | H01Q 1/243 |
| 2004/0114535 A1 * | 6/2004 | Hoffmann .............. | H04B 7/088 370/252 |
| 2009/0298509 A1 * | 12/2009 | Hoshino ............... | H04B 7/0632 455/452.2 |
| 2018/0262918 A1 * | 9/2018 | Zhao .................... | H04B 7/0695 |
| 2019/0150003 A1 * | 5/2019 | He ........................ | H04B 7/086 342/368 |

* cited by examiner

*Primary Examiner* — Ankur Jain
(74) *Attorney, Agent, or Firm* — Westerman, Hattori, Daniels & Adrian, LLP

(57) ABSTRACT

A wireless communication device includes a storage that stores a standard beam table, which is a table constituted by a plurality of antenna weight vector sets corresponding to beam patterns in which beam angular intervals are uniform, and a controller that determines a direction, in which a communication partner's wireless communication device exists, as a direction to be optimized, generates an optimized beam table by changing the angular intervals between the beams of the standard beam table with respect to the direction to be optimized so as to be dense, and performs a communication with the communication partner's wireless communication device using the optimized beam table.

10 Claims, 22 Drawing Sheets

WIRELESS COMMUNICATION DEVICE AND WIRELESS COMMUNICATION METHOD

BACKGROUND OF THE INVENTION

Field of the Invention

The present invention relates to a wireless communication device and a wireless communication method.

Background Art

In order to increase the capacity of wireless communication, development of a wireless communication device using a millimeter wave band is progressing since a wider bandwidth and a higher frequency are used. For example, the 60 GHz band is used in a small cell linked with a mobile communication network or a wireless access network of a wireless Internet service provider, or a wireless backhaul link for a wireless base station, a wireless relay station, or a public wireless LAN communication access point.

In the millimeter wave band where propagation loss is large, a beam antenna having high gain and sharp directivity is generally used. In the IEEE 802.11ad standard, in consideration that a communication partner moves and a plurality of communication partners perform Point to Multi-Point (P2MP) communication, a beamforming antenna whose beam direction can be changed by electrical control from a controller is used. In addition, in the IEEE 802.11ad standard, an optimum beam direction is explored when starting a communication and successively during the communication between the own station and the partner station.

In a wireless communication device conforming to the IEEE 802.11ad standard, for example, as described in U.S. Pat. No. 9,960,877, a search for a suitable beam direction is performed by a beamforming process such as a sector-level sweep (SLS) and a beam refinement protocol (BRP) phase. In the technique described in U.S. Pat. No. 9,960,877, usually, first at least one set of AWVs for realizing a quasi-omni beam pattern is used, and second, a standard beam table is used, in which the angular intervals between the beams are uniform.

According to the technique described in U.S. Pat. No. 9,960,877, when a plurality of beam patterns are sequentially switched and scanned over a certain angular range using a standard beam table including a series of beam patterns, the radiation direction of each designed beam pattern is made to be uniform in an angular interval.

In addition, in recent years, providing an Internet connection service using a wireless access network by a wireless Internet service provider (WISP) and a connection service of a wireless access network by a wireless communication carrier referred to a fixed wireless access (FWA) has been spreading. In these services, the installation location of the user's antenna is fixed and does not move in principle. For this reason, it is required to provide an excellent service to a fixed user's location.

In general, in broadband wireless communication technologies, a modulation and coding scheme (MCS) is switched based on the wireless signal quality, and performs high speed communications when the wireless signal quality is good and performs low speed communications to secure the connection in an environment where the quality is deteriorated. The MCS may be switched due to a slight difference of the wireless signal quality. As a result, a user located in the beam direction has good wireless signal quality, and a user located in the valley between the beams has deteriorated wireless signal quality.

However, in the background technology, for example, described in U.S. Pat. No. 9,960,877, a radiation direction of each beam pattern is arranged in the uniform angular intervals. Therefore, there may be a difference in data rate between a user at the peak direction of the beam and a user at the direction in the valley between the beams.

SUMMARY OF THE INVENTION

The present invention has been made in view of the above circumstances, and is to provide a wireless communication device and a wireless communication method capable of reducing a difference in the wireless signal quality between users.

An aspect of the present invention is a wireless communication device including a storage that stores a standard beam table, which is a table constituted by a plurality of antenna weight vector sets corresponding to beam patterns in which angular intervals between beams are uniform, and a controller that determines a direction, in which a communication partner's wireless communication device exists, as a direction to be optimized, generates an optimized beam table by changing the angular intervals between the beams of the standard beam table with respect to the direction to be optimized so as to be dense, and performs a communication with the communication partner's wireless communication device using the optimized beam table.

According to an aspect of the present invention, in the direction where the radio communication device of the communication partner exists, the beams are densely arranged.

As a result, according to an aspect of the present invention, each wireless communication device of the communication partner can perform stable communication with high-speed MCS with good communication quality. Therefore, the difference of the wireless signal quality between the users can be reduced.

In the wireless communication device according to an aspect of the present invention, the storage may store the plurality of antenna weight vector sets; and the controller may generate the optimized beam table such that selecting an antenna weight vector set corresponding to a beam pattern of the direction to be optimized and arranging the selected set of antenna weights vector set to be selected, determining a beam to be set in a vicinity of the direction to be optimized, and selecting and arranging an antenna weight vector set corresponding to the beam pattern of the determined beam to be set in the vicinity of the direction to be optimized, and determining a beam to be set to a non-optimized region excluding the direction to be optimized and the vicinity thereof, and selecting and arranging an antenna weight vector set corresponding to the beam pattern of the beam to be set in the non-optimized region.

In the wireless communication device according to an aspect of the present invention, when the controller determines the beam to be set in a vicinity of the direction to be optimized, and selects and arranges the antenna weight vector set corresponding to the beam pattern of the determined beam to be set in the vicinity of the direction to be optimized, the controller determines an angular interval between each of two first adjacent beams adjacent to the beam in the direction to be optimized and the beam in the direction to be optimized as a first angular interval, and selects and arranges an antenna weight vector set for the beam pattern of the first adjacent beams corresponding to the determined first angular interval, and the first angular interval may be ½ or less of an angular interval between beams of the standard beam table.

In the wireless communication device according to an aspect of the present invention, the controller determines an angular interval between two second adjacent beams each adjacent to the first adjacent beam and each of the first adjacent beam as a second angular interval, and selects and arranges an antenna weight vector set for the beam pattern of the second adjacent beams corresponding to the determined second angular interval, and the second angular interval may be smaller than an angular interval between the beams of the standard beam table and may be larger than the first angular interval.

In the wireless communication device according to an aspect of the present invention, the first angular interval may be ¼ or less of the angular interval between the beams of the standard beam table, and the second angular interval may be ½ or less of the angular interval between the beams of the standard beam table.

In the wireless communication device according to an aspect of the present invention, when determining a beam to be set to the non-optimized region excluding the direction to be optimized and the vicinity thereof, and selecting and arranging an antenna weight vector set corresponding to the beam pattern of the determined beam to be set in the non-optimized region, the controller may adjust the beam arrangement so as to reduce a deterioration in a gain of valleys between the beam set in the non-optimized region and the beam adjacent to that beam.

In the wireless communication device according to an aspect of the present invention, when adjusting the beam arrangement in the non-optimized region, the controller may adjust the angular intervals between the beams in each of the non-optimized regions to be non-uniform, and may adjust balance of a number of beams provided between the plurality of non-optimized regions.

In the wireless communication device according to an aspect of the present invention, when adjusting the balance of the number of beams, the controller may adjust such that a difference between a gain of the shallowest valley and a gain of the deepest valley is reduced in all the non-optimized regions.

An aspect of the present invention is a wireless communication method performing a communication with a wireless communication device and a communication partner's wireless communication device using an optimized beam table, the wireless communication device comprising a storage that stores a standard beam table, the method comprising: determining a direction in which the communication partner's wireless communication device exists as a direction to be optimized; and generating the optimized beam table by changing the angular interval between the beams of the standard beam table with respect to the direction to be optimized so as to be dense.

According to the aspects of the present invention described above, it is possible to reduce the difference of the wireless signal quality between the users.

DETAILED DESCRIPTION OF THE PREFERRED EMBODIMENTS

Hereinafter, embodiments of the present invention will be described with reference to the drawings.
(Configuration Example of Wireless Communication System)

Figure 1:
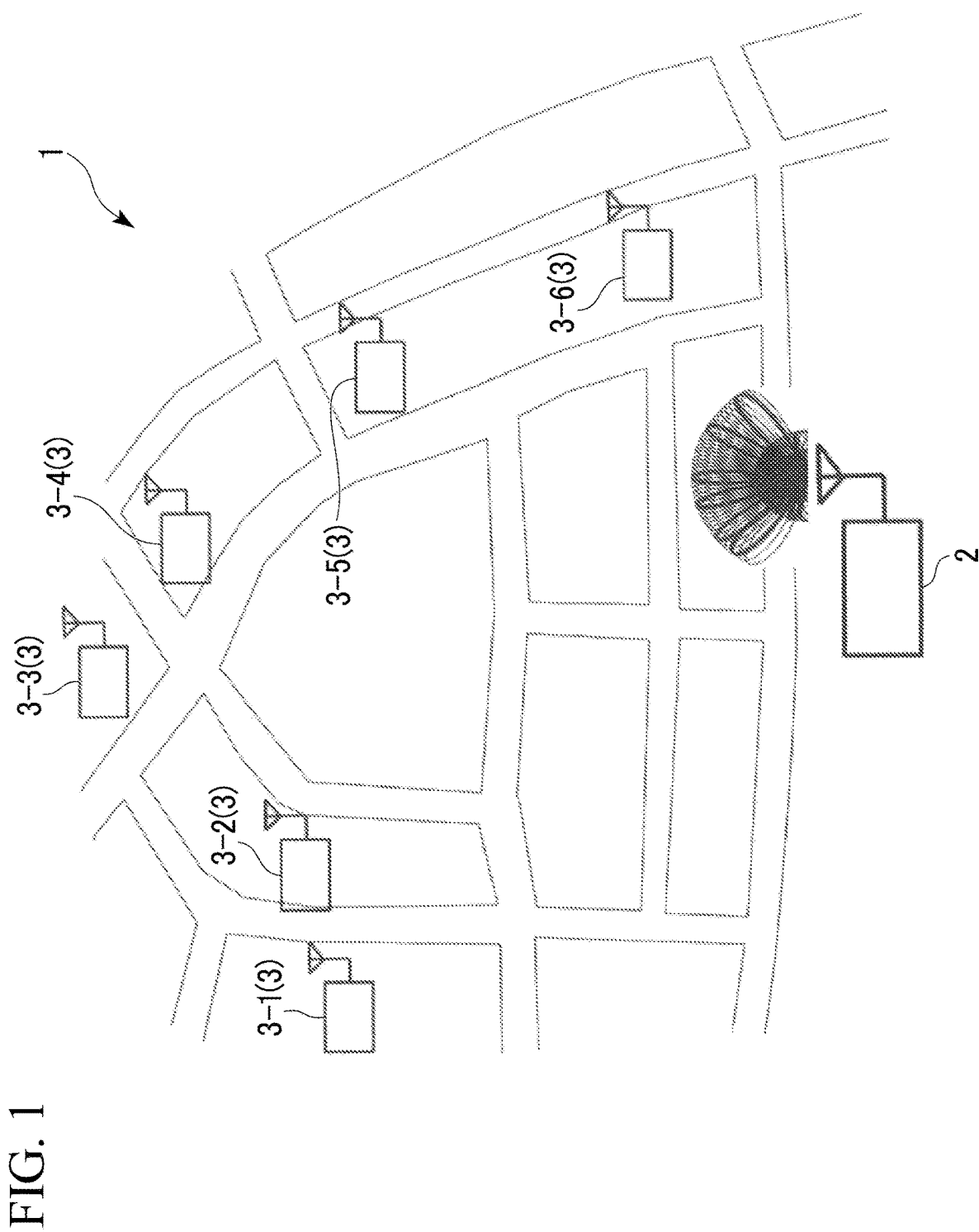
FIG. 1 is a diagram showing an example of a wireless communication system using a wireless communication device according to an embodiment.

FIG. 1 is a diagram showing an example of a wireless communication system using the wireless communication device according to the embodiment. As shown in FIG. 1, the wireless communication system 1 includes a first wireless communication device 2 (hereinafter, also simply referred to as a wireless communication device 2) and a second wireless communication devices 3-1, 3-2, 3-3, 3-4, 3-5, and 3-6. In the following description, when one of the second wireless communication devices 3-n (n is an integer from 1 to 6) is not specified, it is referred to as a second wireless communication device 3.

The first wireless communication device 2 is connected to an upper-level network such as a provider network via an optical fiber line or another communication line, and is thereby connected to a network such as the Internet. The first wireless communication device 2 is a wireless communication device installed by a service provider such as a WISP or a wireless communication carrier.

The second wireless communication device 3 is installed at a user's house who uses a service provided by a service provider such as a WISP or a wireless communication carrier, for example. The number of the second wireless communication devices 3 is not limited to six, and may be one or more.

The first wireless communication device 2 and at least one of the second wireless communication devices 3-1 to 3-6 include a beamforming antenna and a controller for executing beamforming inside the device. The first wireless communication device 2 and the second wireless communication device 3 recognize each other in the process of performing beamforming, select an appropriate beam, and select a modulation and coding scheme (MCS) according to the wireless signal quality to perform wireless communication. In the following description, an example will be described in which the first wireless communication device 2 includes a beamforming antenna and includes a controller that executes beamforming inside the device.

Note that the first wireless communication device 2 and the second wireless communication device 3 are not limited to a service provider and a service user, and an organization such as a company or a public organization can use both as an internal network.
(Explanation of Terms Used in Embodiment)

Here, an outline of a wireless communication device that performs communication using a beamforming antenna and terms used in the embodiments will be described.

In the basic configuration of a beamforming antenna, by feeding each of the aligned antenna elements with a phase shifted signal so that radio waves with the same phase in the desired direction are radiated, and a beam with sharp directivity is radiated.

In designing a beam pattern of a beam that radiates a radio wave in a desired direction, the phase and the power to be fed to each antenna element are determined by calculating the phase condition such that the radio waves radiated from the antenna element are interfered and intensified in a desired direction based on the arrangement of each antenna element of the antenna array, the distance between the antenna elements, the wavelength of the radiated radio wave, and the like.

A wireless communication device including a beamforming antenna includes a beam table constituted by a plurality of antenna weight vectors (AWVs). Here, the AWV indicates a vector representing the gain of the amplitude adjuster and the amount of phase shift of the variable phase shifter corresponding to each antenna element. When the beamforming antenna is configured by the n number of antenna elements, the n sets of AWVs indicates one beam pattern.

A calculation of the radiation directivity of the entire array antenna solely based on the AWV is referred to as an array factor. When the antenna element is an omnidirectional antenna, the array factor is the radiation pattern of the entire array antenna as it is. When the antenna element has directivity, the product of the array factor and the radiation pattern of the antenna element is the radiation pattern of the entire array antenna.
(Configuration Example of Wireless Communication Device)

Figure 2:
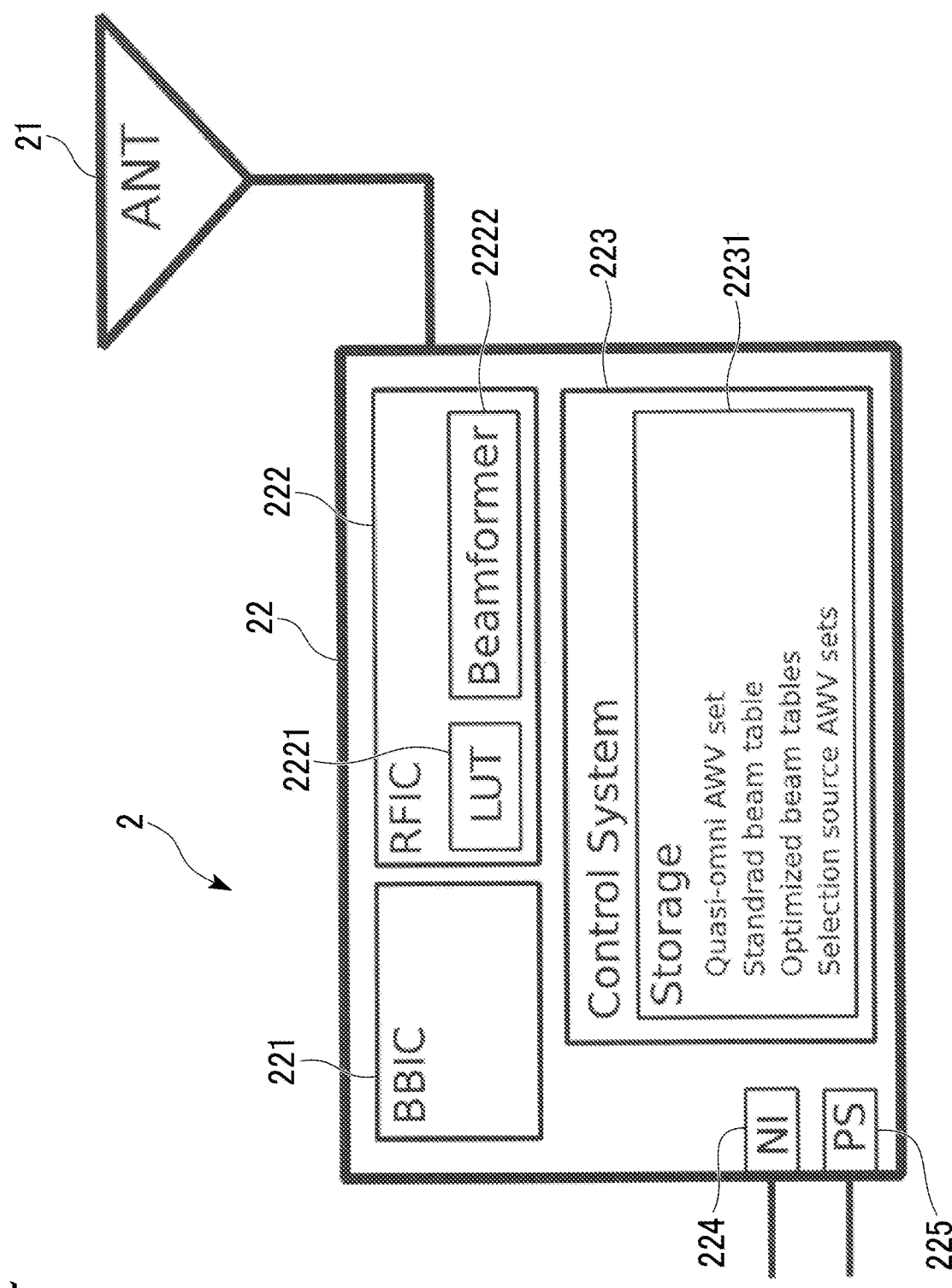
FIG. 2 is a block diagram showing a configuration example of a wireless communication device according to an embodiment.

FIG. 2 is a block diagram showing a configuration example of the wireless communication device according to the embodiment. As shown in FIG. 2, the wireless communication device 2 includes an antenna 21 and a controller 22.

The controller 22 includes a BBIC 221, an RFIC 222, a control system 223, a network interface (NI) 224, and a power supply (PS) 225.

The RFIC 222 includes an LUT 2221 and a beamformer 2222.

The control system 223 includes a storage 2231.

The antenna 21 is a digital phased array type beamforming antenna in which a plurality of elements are arranged and the plurality of elements can be electrically controlled by a set value of an antenna weight vector (AWV).

The BBIC 221 is, for example, a baseband integrated circuit. The BBIC 221 is a controller that processes a baseband signal, and mediates control of the RFIC 222 from the control system 223 in some cases.

The RFIC 222 is, for example, a radio frequency integrated circuit, is in charge of processing of high-frequency signals, transmits and receives millimeter-wave signals, and performs beamforming. The RFIC 222 sets the AWV by setting a numerical value in the LUT 2221.

The LUT 2221 is a look-up table and accommodates a set of the plurality of AWVs as a beam pattern table. Note that each of AWV's corresponds to one beam pattern and is constituted by AWVs corresponding to the number of antenna elements. In addition, the LUT 2221 stores an optimized beam table optimized by the control system 223 as described later.

The beamformer 2222 controls feeding to the antenna element based on the set value of the AWVs.

The control system 223 is connected to an upstream network such as the Internet connected to the wireless communication device 2 via the NI 224. The control system 223 controls communication between the first network via the NI 224 and the second network connected via a communication line via the antenna 21 by controlling the BBIC 221 and the RFIC 222. The control system 223 executes the control of the BBIC 221 and the RFIC 222 according to, for example, a program by referring to various databases. The control system 223 may include a central processing unit (CPU), a System-on-a-Chip (SoC), an Application Specific Integrated Circuit (ASIC), and the like.

The storage 2231 stores a plurality of sets of AWVs designed in advance and a plurality of beam tables in which the plurality of sets of AWVs are combined for a predetermined number of beams. The storage 2231 is a recording medium such as a hard disk drive (HDD), a solid state drive (SSD), a flash memory, and the like. Alternatively, the storage 2231 may be a nonvolatile storage region included inside an ASIC, a SoC and the like. As a set of AWVs, first there is at least one set of AWVs for realizing a quasi-omni beam pattern, and second, there is at least one standard beam table in which the angular intervals between the beams are uniform. The standard beam table is a series of the beams covering a certain angular range and each beam is constituted by a series of AWV sets corresponding to the beam pattern of each direction. The storage 2231 stores a further optimized beam table. Also, the storage 2231 stores a group of AWV sets that are selection sources for configuring the optimized beam table.

The NI 224 is a network interface for connecting the wireless communication device 2 to the upstream network.

The PS 225 is a power supply, and supplies power supplied from the outside to each unit of the wireless communication device 2.

Here, an example of information stored in the storage 2231 will be described.

Figure 3:
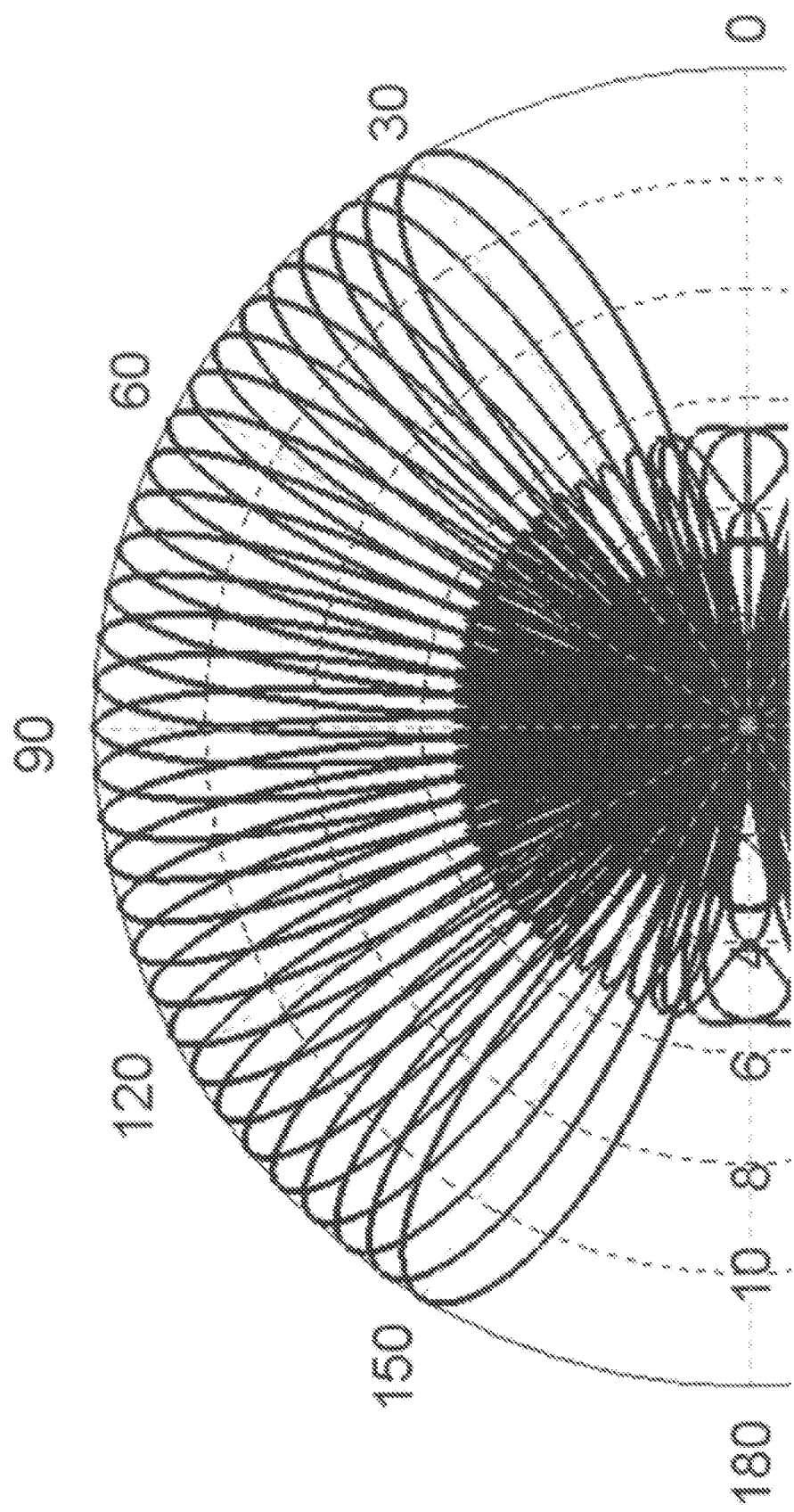
FIG. 3 is a diagram showing in polar coordinates, array factors of respective thirty-one beams existing every 4 degrees in the angular range of 120 degrees from 30 to 150 degrees in a standard beam table stored in a storage according to the first embodiment.

FIG. 3 is a diagram showing in polar coordinates, array factors of respective thirty-one beams existing every 4 degrees in the angular range of 120 degrees from 30 to 150 degrees in a standard beam table stored in a storage 2231 according to the present embodiment. The beam angular interval is 4 degrees.

Figure 4:
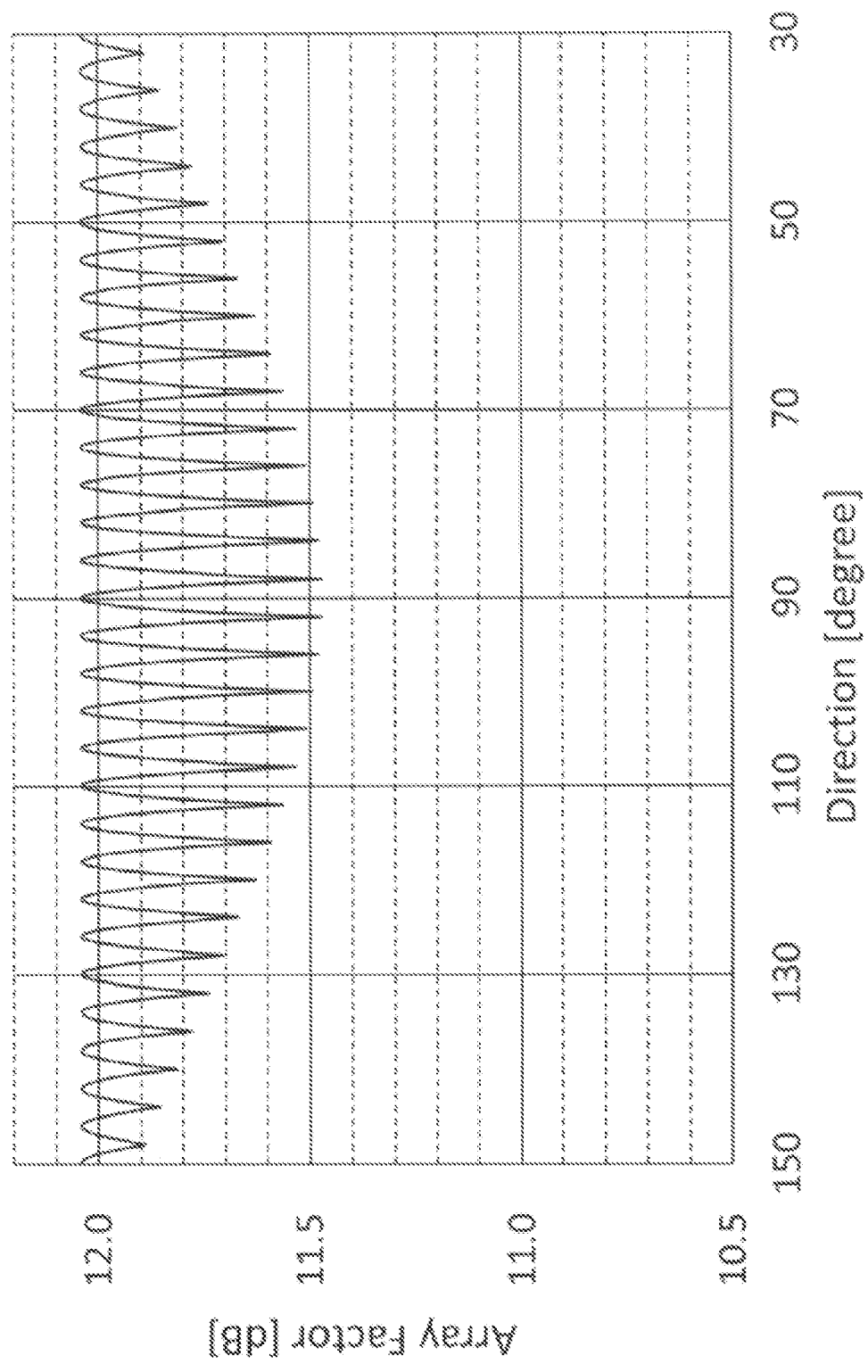
FIG. 4 is a diagram in which only the beam having the largest gain in each direction is selected and depicted in the standard beam table stored in the storage according to the first embodiment.

FIG. 4 is a diagram in which only the beam having the largest gain in each direction is selected and depicted in the standard beam table stored in the storage 2231 according to the present embodiment. In FIG. 4, the horizontal axis is a direction [degree] and the vertical axis is an array factor [dB].

Figure 5:
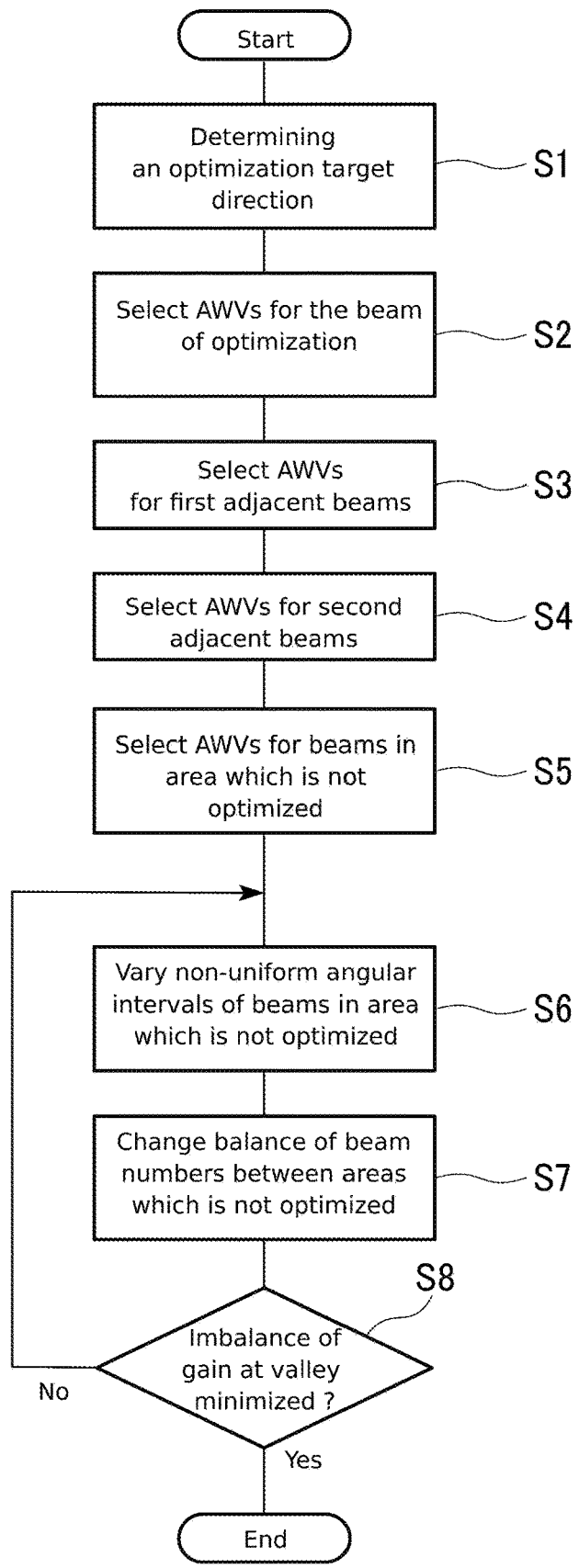
FIG. 5 is a flowchart of a process in which the wireless communication device according to the first embodiment dynamically forms an optimized beam table.

FIG. 5 is a flowchart of a process in which the wireless communication device 2 according to the present embodiment dynamically forms an optimized beam table.

(Step S1) The control system 223 determines a target direction of optimization.

(Step S2) The control system 223 selects the AWVs for the beam for the target direction of optimization.

(Step S3) The control system 223 selects the AWVs for the first adjacent beams.

(Step S4) The control system 223 selects the AWVs for the second adjacent beams.

(Step S5) The control system 223 selects the AWVs for the beam in the region which is not optimized so that the angular intervals become substantially uniform.

(Step S6) The control system 223 changes the angular intervals between the beams in the region which is not optimized to be non-uniform.

(Step S7) The control system 223 changes the balance of the number of beams between the regions which are not optimized.

(Step S8) The control system 223 determines whether or not the gain imbalance at the valley has been minimized. When the control system 223 determines that the imbalance of the gain in the valley is minimized (Step S8; Yes), the process ends. When the control system 223 determines that the imbalance of the gain in the valley is not minimized (Step S8; No), the process iterates from Step S6.

As described above, in the present embodiment, an optimized beam table is generated by selecting a set of antenna weight vectors corresponding to a beam pattern of the direction to be optimized and arranging the selected set of antenna weights vectors, determining a beam to be set in a vicinity of the direction to be optimized and selecting and arranging the set of antenna weight vectors corresponding to the beam pattern of the determined beam to be set in the vicinity of the direction to be optimized, and selecting and arranging a set of antenna weight vectors corresponding to the beam pattern of the beam set in the non-optimized region excluding the direction to be optimized and the vicinity thereof.

First Example

In the first example, an example of a process procedure in which the wireless communication device 2 dynamically constitutes an optimized beam table for two directions (70 degrees and 110 degrees) will be described with reference to FIG. 5.

As a specific example, a case where it is determined that a communication partner exists in two directions of 70 degrees and 110 degrees, as a result of the first wireless communication device 2 starting communication with the second wireless communication device 3 using the quasi-omni beam pattern and the standard beam table, will be described.

In this case, the control system 223 determines to generate an optimized beam table optimized in the two directions of 70 degrees and 110 degrees (Step S1).

Here, in the storage 2231, a plurality of beams which is a selection source of the beams constituting the optimized beam table, that is, the sets of AWVs, is stored. In the following example, 1201 beams are prepared in advance which is covering the angular range of 120 degrees with a 0.1-degree interval by calculating the AWVs.

Next, the control system 223 densely arranges the beams in desired directions, that is, at 70 degrees, 110 degrees and in the vicinities thereof (Steps S2 to S4).

Here, the reason for performing the processes of Steps S2 to S4 will be described. The standard beam table has an angular interval of 4 degrees. Even if a beam of 70 degrees is selected as the optimum beam in the standard beam table, when the direction of the actual user's device is close to 68 degrees or 72 degrees, there is a possibility that the direction corresponds to the valley of the beam and the gain deteriorates, and thus an MCS having a lower communication speed may be selected. Therefore, the control system 223 selects the beam of 70.0 degrees from the selection source of 1201 beams, which is the 1201 sets of AWVs, and arranges them in the optimized beam table. Similarly regarding a beam of 110 degrees, the control system 223 selects the beam of 110.0 degrees from the 1201 sets of AWVs, and arranges them in the optimized beam table (Step S2).

Next, the control system 223 arranges the second and the third beams as the first adjacent beams (beams of 69.0 degrees and 71.0 degrees) so as to sandwich the 70.0-degree beam. Similarly, the control system 223 arranges the second and the third beams as the first adjacent beams (beams of 109.0 degrees and 111.0 degrees) so as to sandwich the 110.0-degree beam (Step S3). In the embodiment, the two beams of the second and third beams are referred to as the first adjacent beams.

The control system 223 arranges the fourth and the fifth beams as the second adjacent beams (beams of 67.0 degrees and 73.0 degrees) so as to sandwich three beams (beams of 70.0, 69.0, and 71.0 degrees). Similarly, the control system 223 arranges the fourth and the fifth beams as the second adjacent beams (beams of 107.0 degrees and 113.0 degrees)

so as to sandwich three beams (beams of 110.0, 109.0, and 111.0 degrees) (Step S4). In the embodiment, the two beams of the fourth and fifth beams are referred to as the second adjacent beams.

Through the processes in Steps S2 to S4, the control system 223 makes the angular intervals between the beams in the vicinity of the 70-degree direction and in the vicinity of the 110-degree direction dense.

In the present embodiment, the two angular intervals, which are an angular interval between the second first adjacent beam and the beam of the optimization direction and an angular interval between the beam of the optimization direction and the third first adjacent beam, are the first angular interval, and the first angular interval is narrower than an angular interval in the standard beam table.

In addition, in the present embodiment, the two angular intervals, which are an angular interval between the fourth second adjacent beam adjacent to the second first adjacent beam and the second first adjacent beam, and an angular interval between the fifth second adjacent beam adjacent to the third first adjacent beam and the third first adjacent beam, are the second angular interval. In the present embodiment, the second angular interval is narrower than the angular interval in the standard beam table and is wider than the first angular interval.

In the present embodiment, for example, the first angular interval is set to 1 degree, which is ¼ of 4 degrees, which is the angular interval of the standard beam table. In addition, in the present embodiment, the second angular interval is set to 2 degrees smaller than 4 degrees and wider than 1 degree of the first angular interval.

Note that the first angular interval is preferably half or less of the angular interval of the standard beam table, and more preferably ¼ or less of the angular interval of the standard beam table.

The second angular interval is preferably ¾ or less of the angular interval of the standard beam table, and more preferably ½ or less of the angular interval of the standard beam table. In order to make such a beam as selectable, it is preferable that the set of AWVs as a selection source is stored approximately four times larger than the number of beams of the standard beam table.

When the number of beams in the standard beam table is N, it is preferable that at least the (N−1)×4+1 sets of AWVs are prepared in advance.

Next, the control system 223 determines the number of beams being arranged in each non-optimized region and arranges the beams (Step S5). The non-optimized regions are:

the first non-optimized region from 30 degrees which is a start direction to 67.0 degrees which is a direction of the fourth second adjacent beams close to the beam of 70.0 degrees which is the first optimization direction, the second non-optimized region from 73.0 degrees which is a direction of the fifth second adjacent beams close to the beam of the first optimization direction to 107.0 degrees which is a direction of the fourth second adjacent beam close to the beam of 110.0 degrees which is the second optimization direction, and the third non-optimized region from 113.0 degrees which is a direction of the fifth second adjacent beams close to the beam of the second optimization direction to 150 degrees which is an end direction.

Specifically, first, the control system 223 distributes the number of beams according to a ratio of the angular range of each non-optimized region. In the present embodiment, the control system 223 arranges seven beams in the first non-optimized region, six beams in the second non-optimized region, and eight beams in the third non-optimized region. Next, the control system 223 arranges the beams with substantially uniform angular distribution in each non-optimized region.

Figure 6:
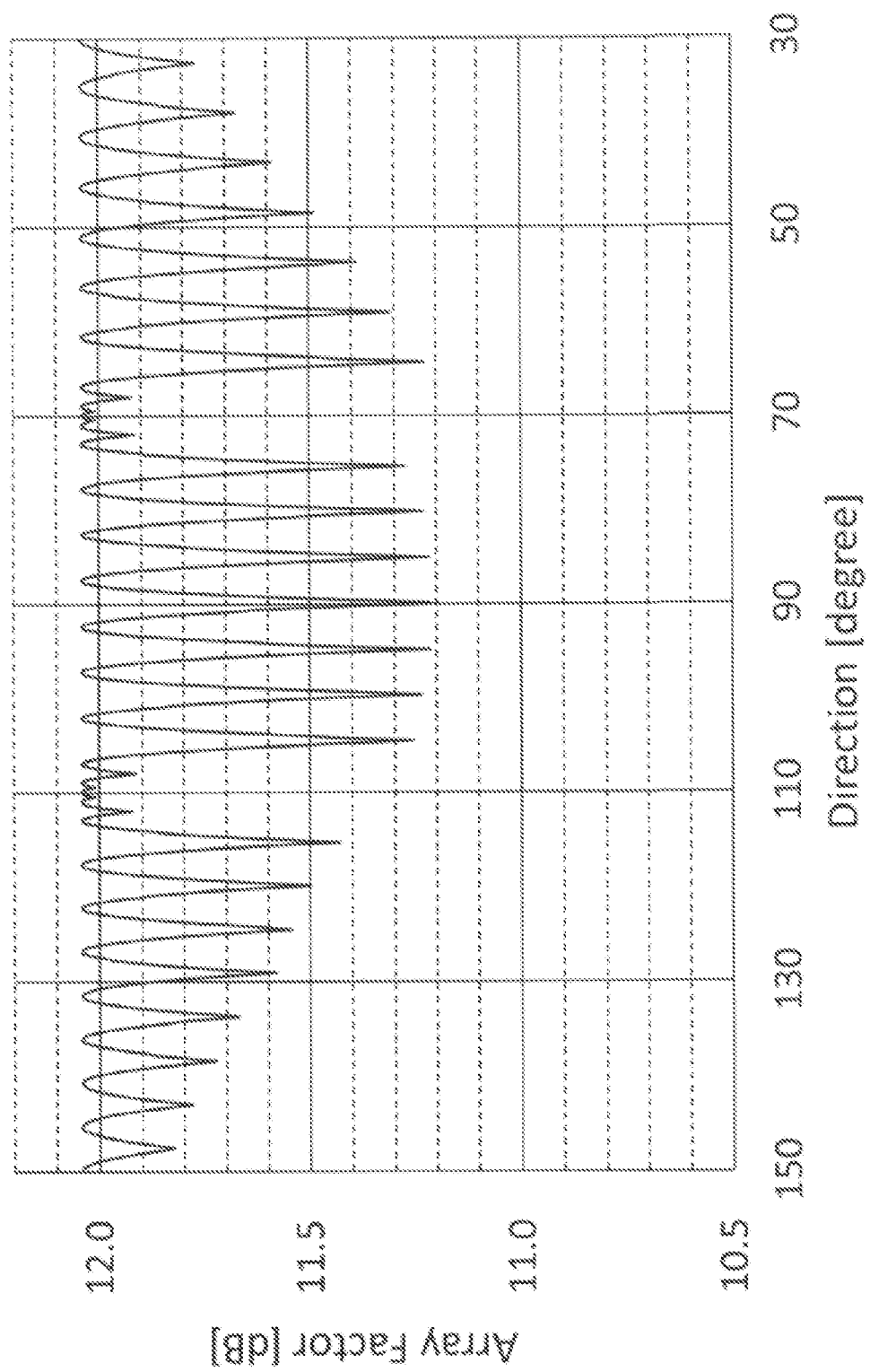
FIG. 6 is a diagram showing an array factor of the optimized beam table after rearranging the beams when the communication partner exists in two directions of the 70-degree direction and the 110-degree direction.

FIG. 6 shows an example of the optimized beam table at this stage. FIG. 6 is a diagram showing an array factor of the optimized beam table after rearranging the beams when the communication partner exists in two directions of the 70-degree direction and the 110-degree direction. In FIG. 6, the horizontal and vertical axes are the same as those in FIG. 4. As shown in FIG. 6, in the 70-degree direction and the 110-degree direction including the vicinities thereof, the beams are densely arranged and the valley of the gain is shallow. Any of the second wireless communication device 3 used by the user can perform stable communication with the high-speed MCS with good communication quality.

In the first example, the gain is further optimized. In the beam table of FIG. 6, the gain is improved in the vicinity of the optimization direction; however in other directions, a deep valley of the gain is observed. For example, the array factor [dB] in the 90-degree direction and the 94.8-degree direction is 11.21 dB. In the present embodiment, the valleys of the gain are leveled to reduce the deterioration of the gain.

Here, a specific example of optimization will be described.

First, in each non-optimized region, the control system 223 adjusts the beam direction such that the beam interval becomes narrower for the directions in which the gain valley is deep and the beam interval becomes wider for the directions in which the gain valley is shallow to perform the replacement of the set of AWVs to be selected (Step S6).

In the case of the first non-optimized region in FIG. 6, the seventh valley in the 64.4-degree direction is 11.23 dB, and the first valley in the 32.7-degree direction is 11.77 dB. The difference of the maximum and the minimum of the gain valleys in the region is 0.54 dB.

The control system 223 reduces the interval between the seventh beam and the eighth beam in which the seventh valley is formed by 0.1 degrees, and increases the interval between the first beam and the second beam in which the first valley is formed by 0.1 degrees. Thereby, the first beam to the seventh beam are rearranged, and the calculation of the array factor is performed again. The difference between the maximum value and the minimum value of the gain valley in the region is improved from 0.54 dB to 0.50 dB.

The control system 223 repeats these processes, and when the difference between the maximum value and the minimum value of the gain valley in the region is, for example, 0.02 dB and the difference is not improved after the rearrangement compared to the previous rearrangement, the arrangement at 0.02 dB is employed, and the optimization operation is completed. The control system 223 performs these processes with respect to each non-optimized region.

Next, after the above-described processes are completed, the control system 223 performs operations so as to compare the deepest valley of the gain of each non-optimized region, reduce one beam from the non-optimized region with a shallow gain valley, and increase one beam to the non-optimized region with a deep gain valley (Step S7).

In the first example, the deepest gain valleys are 11.50 dB in the first non-optimized region, 11.21 dB in the second non-optimized region, and 11.63 dB in the third non-optimized region. The control system 223 reduces the number of beams in the third non-optimized region from eight to seven, and increases the number of beams in the second non-optimized region from six to seven.

The control system 223 again arranges the beams with an approximately uniform angular interval in an angular range of each non-optimized region based on the increased or decreased number of beams.

The control system 223 repeats Steps S6 and S7. When the difference between a gain of the shallowest valley and a gain of the deepest valley in all the non-optimized regions is minimized, the arrangement at the moment is employed and the rearrangement of the non-optimized region is completed. The optimized beam tables finally obtained after the process is completed is shown in FIGS. 7 and 8.

Figure 7:
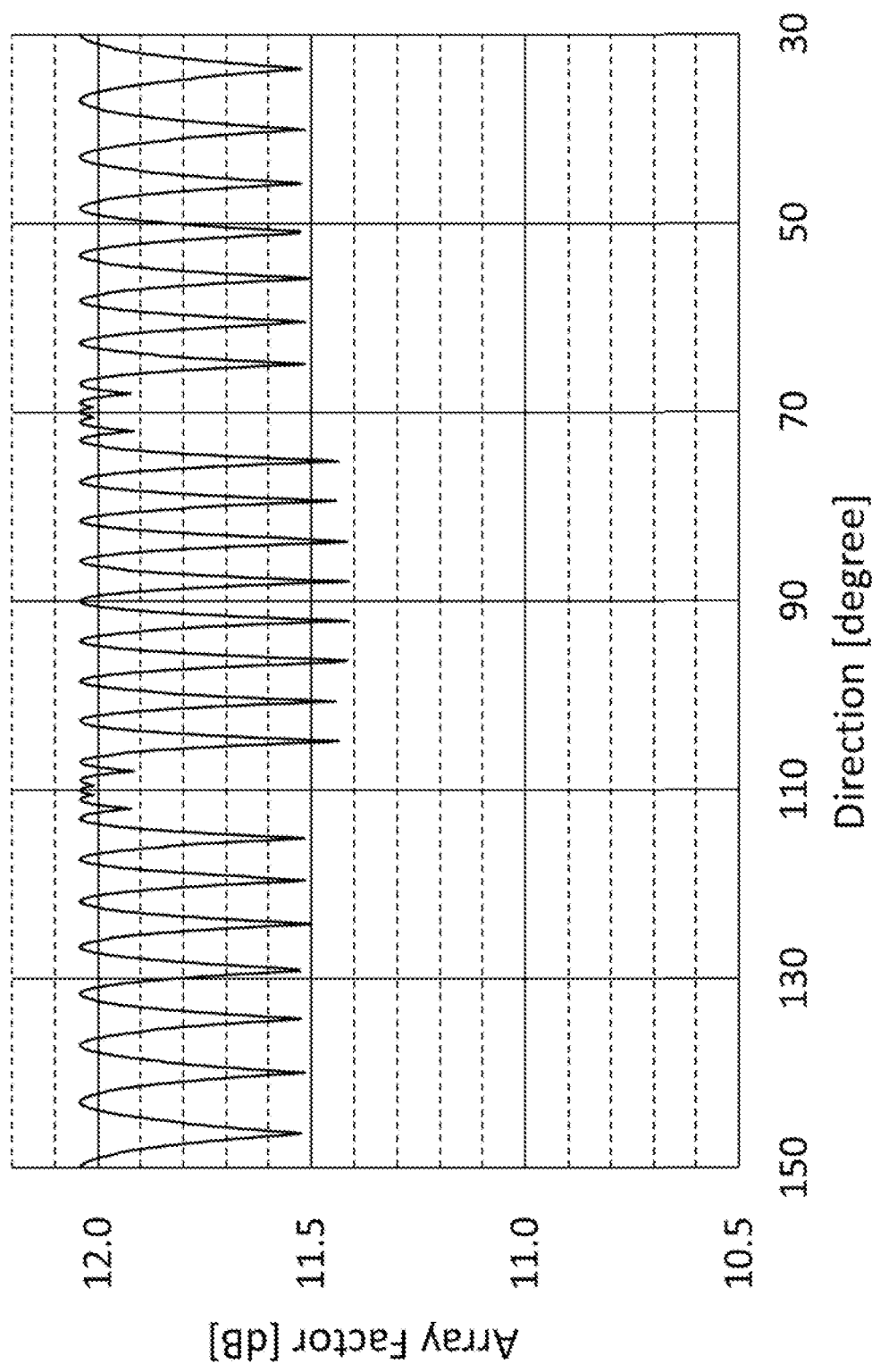
FIG. 7 is a diagram showing an array factor after rearranging the beams in non-optimized regions after optimizing the optimized beam table according to the first example.
Figure 8:
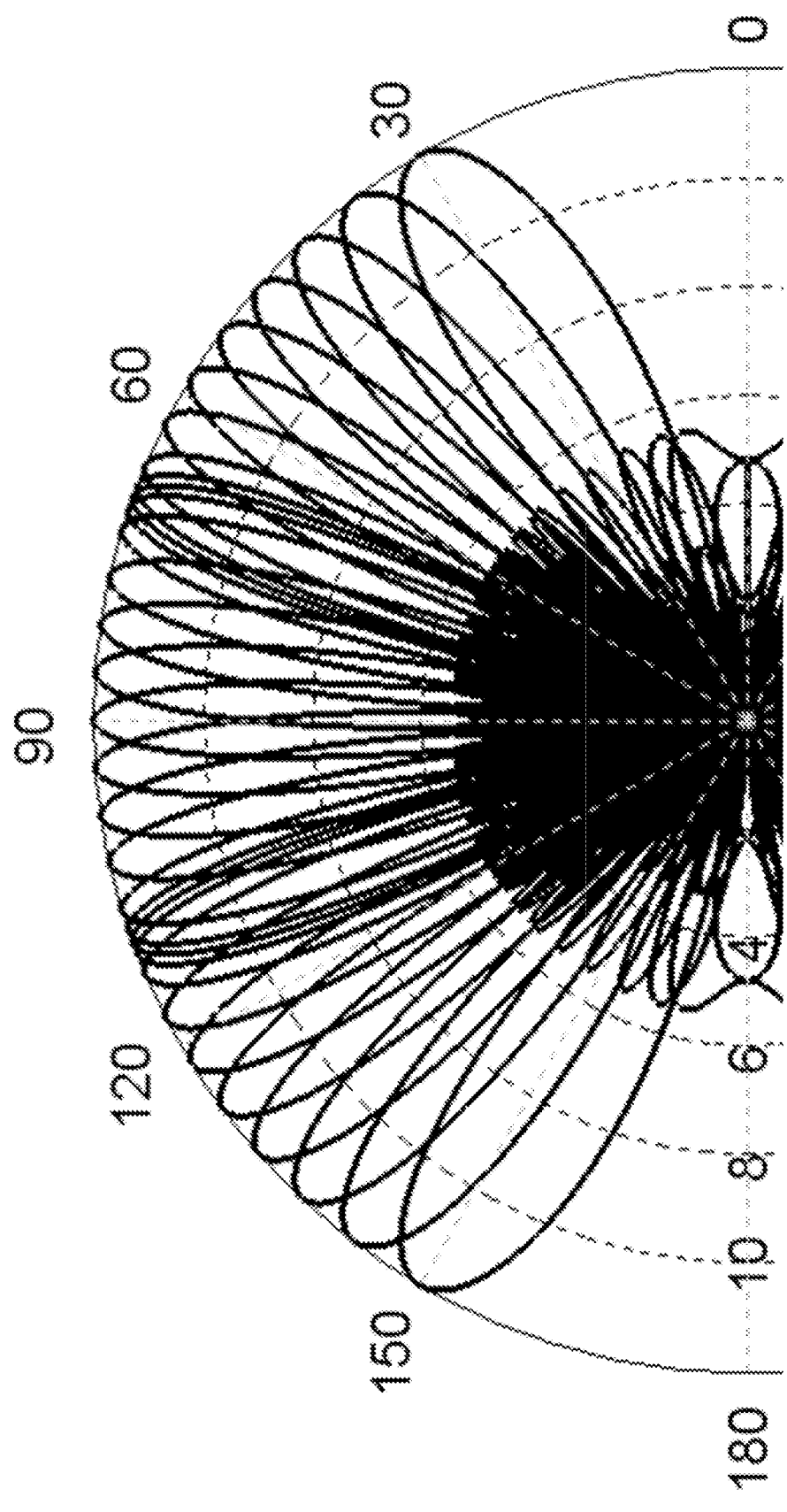
FIG. 8 is a diagram showing in polar coordinates, an array factor after rearranging the beams in non-optimized regions after optimizing the optimized beam table according to the first example.

FIG. 7 is a diagram showing an array factor after rearranging the beams in non-optimized regions after optimizing the optimized beam table according to the first example. The horizontal and vertical axes of FIG. 7 are the same as FIG. 4. FIG. 8 is a diagram showing in polar coordinates, an array factor after rearranging the beams in non-optimized regions after optimizing the optimized beam table according to the first example. The coordinates of FIG. 8 are the same as those in FIG. 3.

In the stage of FIG. 6 before the rearrangement and after the optimization, the number of beams in the first non-optimized region is seven, the number of beams in the second non-optimized region is six, and the number of beams in the third non-optimized region is eight. The deepest valley in gain is 11.21 dB in the 90.0-degree direction and the shallowest valley in gain is 11.83 dB in the 147.6-degree direction, and the difference is 0.62 dB.

After the rearrangement, the numbers of beams in three non-optimized regions are adjusted to seven, seven and seven, respectively, and the interval is adjusted to non-uniform. The deepest valley in gain is 11.41 dB in the 87.9-degree direction and 92.1-degree direction, and the shallowest valley in gain is 11.53 dB in the 51.0-degree direction and 129.0-degree direction. The difference is 0.12 dB which is improved compared to the difference before the rearrangement.

The wireless communication device 2 according to the first example sets the optimized beam table generated in the above manner in the LUT 2221 and uses for exploring a beam direction next time. As a result of the beam exploration after the next time, when the number of wireless communication devices of the communication partner increases or decreases, or the wireless communication device of the partner disappears from the direction where the device existed previously and communication with the wireless communication device in another direction needs to be started, the control system 223 performs generating the optimized beam table again. In such a case, the control system 223 may start over from the exploration using the standard beam table.

Comparative Example

Here, a comparative example will be described.

The IEEE 802.11ad standard shows the relationship between the MCS and receiver sensitivity for the 60 GHz millimeter-band communication referred to a directional multi-gigabit (DMG).

For example, the sensitivity required for the MCS 10 is −55 dBm, the sensitivity required for the MCS 11 is −54 dBm, and the sensitivity required for the MCS 12 is −53 dBm, and the MCS switches with a slight difference in wireless signal quality.

For this reason, a user who installs the wireless communication device at a location just matches the direction of the beam has good wireless signal quality, and a user who installs the wireless communication device at a location of the valley of the beams has deteriorated wireless signal quality.

For the conventional technique, a user who is just located in a beam direction may use, for example MCS 12. However, it may occur that another user located in the valley of the beams can only use MCS 11. In the IEEE 802.11ad standard, the data rate in each MCS is 3,080 Mbps in MCS 10, 3,850 Mbps in MCS 11, and 4,620 Mbps in MCS 12. For example, when the MCS 10 is used since the MCS 11 cannot be used, the performance is reduced by 20% as compared with the MCS 11. When the MCS 11 is used since the MCS 12 cannot be used, the performance is reduced by 17% as compared with the MCS 12.

In contrast, according to the first example, since the optimization of the optimized beam table for the two directions is performed as described above, the arrangement can be realized such that the valley of the gain is shallow in vicinity of the optimization direction, for example, as shown in FIG. 7 with respect to FIG. 4. As a result, according to the first example, the valley of the gain is shallow in the vicinity of the optimization direction. Therefore, it is possible to prevent the MCS having a low communication speed from being selected due to the deterioration of the communication quality of the user who installs the wireless communication device in the valley direction of the beam, and to reduce the difference in the communication speed between the users. In addition, according to the first example, since the optimized beam table is rearranged after the optimization, the difference between the valleys of the gain in the non-optimization region is reduced as shown in FIG. 7 with respect to FIG. 6. As a result, according to the first example, the difference between the valleys of the gain in the non-optimized region is reduced. Therefore, it is possible to prevent the MCS having a low communication speed from being selected due to the deterioration of the communication quality of the user who installs the wireless communication device in the valley direction of the beam, and to reduce the difference in the communication speed between the users even when the communication with a wireless communication device in other directions is started such that the number of wireless communication devices of the communication partner increases after the determination of the optimization direction.

Second Example

In the second example, an example of a process in which the wireless communication device 2 dynamically constitutes an optimized beam table for three directions (70, 110, and 130 degrees) will be described with reference to FIG. 5.

In this case, the control system 223 determines to generate an optimized beam table optimized in the three directions of 70, 110, and 130 degrees (Step S1).

Next, the control system 223 densely arranges the beams in desired directions, that is, 70, 110, and 130 degrees and in the vicinity thereof (Steps S2 to S4).

In the present example, regarding beams of 70, 110, and 130 degrees, the control system 223 selects the beams of 70.0, 110.0, and 130.0 degrees from the AWVs as a selection source, and arranges them in the optimized beam table (Step S2). Next, the control system 223 arranges the second and third first adjacent beams so as to sandwich each of the beams at 70.0, 110.0, and 130.0 degrees (Step S3).

The control system 223 arranges the fourth and fifth second adjacent beams so as to sandwich three beams including the second first adjacent beam and the third first adjacent beam with respect to 70.0, 110.0, and 130.0 degrees, respectively (Step S4).

Through the processes of Steps S2 to S4, the control system 223 makes the angular intervals between the beams dense in the vicinity of the 70-degree direction, in the vicinity of the 110-degree direction, and in the vicinity of the 130-degree direction, respectively.

Next, the control system 223 determines the number of beams to be arranged in each non-optimized region, and arranges the beams (Step S5).

Figure 9:
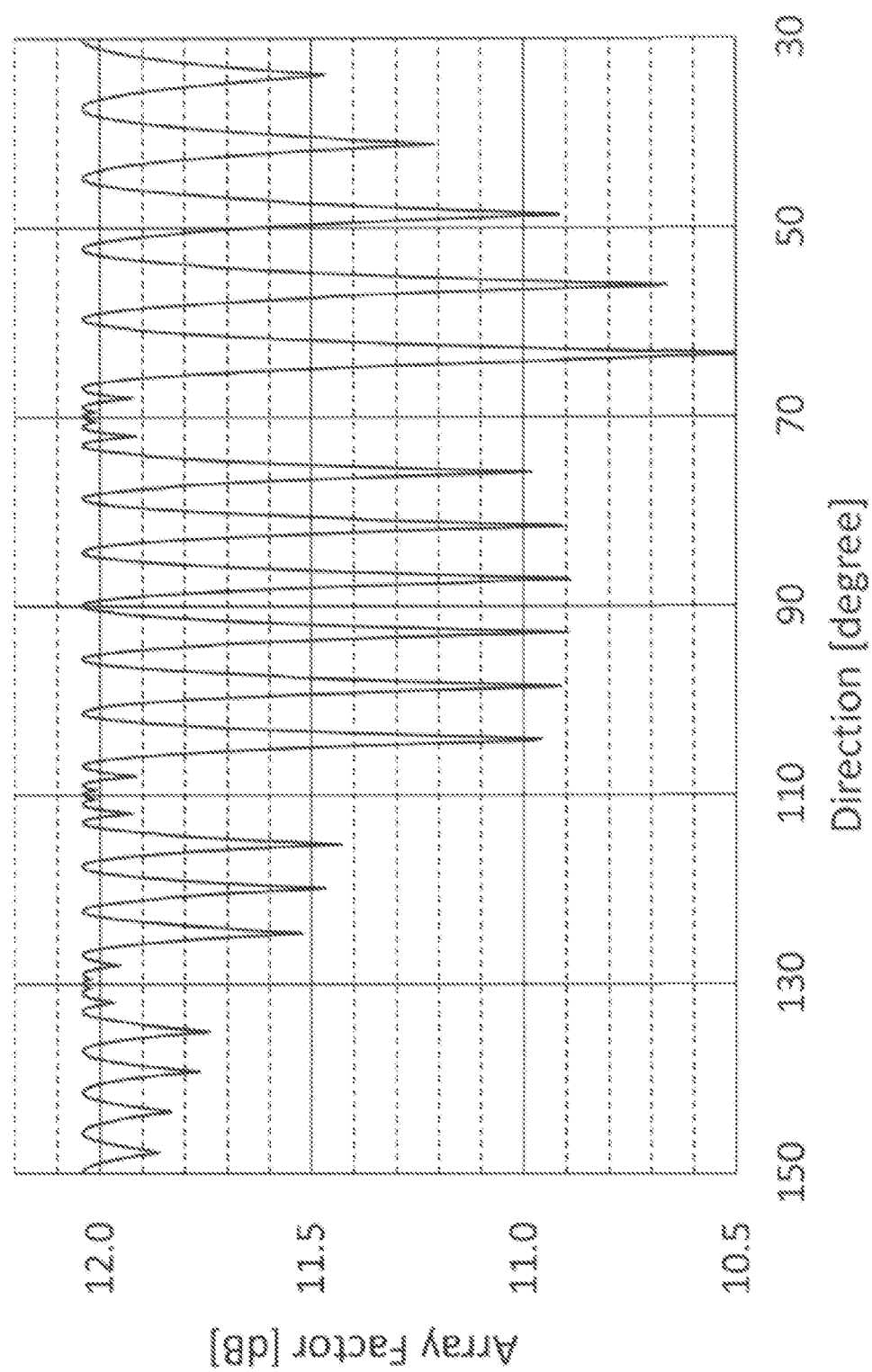
FIG. 9 is a diagram showing an array factor of the beam table before rearranging the beams in non-optimized regions after the optimization according to the second example.

FIG. 9 shows an example of the optimized beam table at this stage. FIG. 9 is a diagram showing an array factor of the beam table before rearranging the beams in non-optimized regions after the optimization according to the second example. The horizontal and vertical axes of FIG. 9 are the same as those in FIG. 4.

Next, in each non-optimized region, the control system 223 adjusts the beam direction such that the beam interval becomes narrower for the directions in which the gain valley is deep and the beam interval becomes wider for the directions in which the gain valley is shallow to perform the replacement of the set of AWVs to be selected. The control system 223 uses the difference between the maximum and the minimum of the valley of the gain in the non-optimized region as an index, and ends the adjustment of the non-optimized region when the improvement does not occur even after the replacement (Step S6).

Next, after the above-described processes are completed, the control system 223 performs operations so as to compare the deepest valley of the gain of each non-optimized region, reduce one beam from the non-optimized region with a shallow gain valley, and increase one beam to the non-optimized region with a deep gain valley (Step S7).

The control system 223 again arranges the beams with an approximately uniform angular interval in an angular range of each non-optimized region based on the increased or decreased number of beams.

The control system 223 repeats Steps S6 and S7. When the difference between a gain of the shallowest valley and a gain of the deepest valley in all the non-optimized regions is minimized, the arrangement at the moment is employed, and the rearrangement of the non-optimized region is completed. The optimized beam tables finally obtained after the process is completed is shown in FIGS. 10 and 11.

Figure 10:
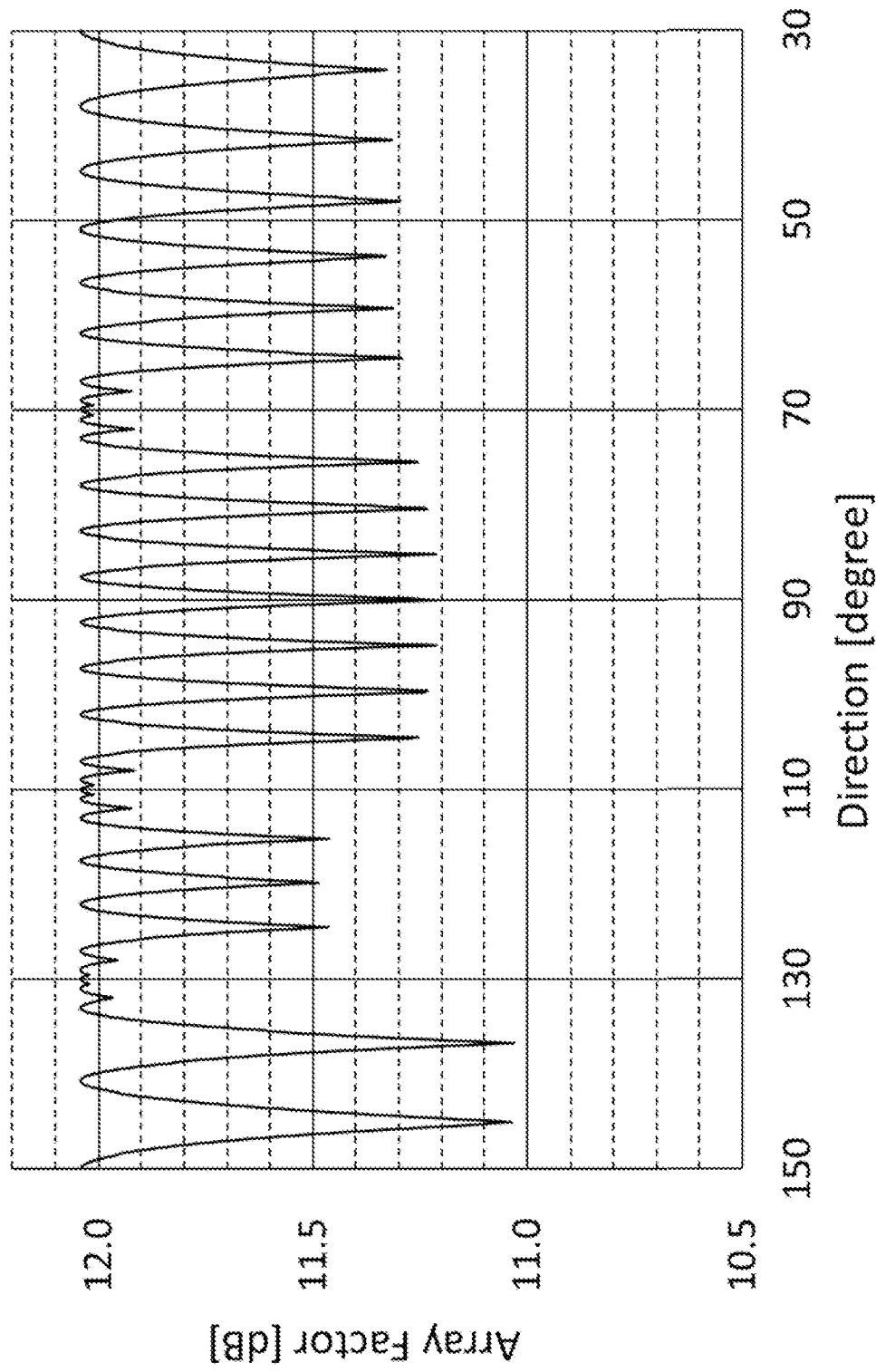
FIG. 10 is a diagram showing an array factor of the beam table after rearranging the beams in non-optimized regions after the optimization according to the second example.

FIG. 10 is a diagram showing an array factor of the beam table after rearranging the beams in non-optimized regions after the optimization according to the second example. The horizontal and vertical axes of FIG. 10 are the same as those in FIG. 4. FIG. 11 is a diagram showing in polar coordinates, an array factor of the beam table after rearranging the beams in non-optimized regions after the optimization according to the second example. The coordinates of FIG. 11 are the same as those in FIG. 3.

Figure 11:
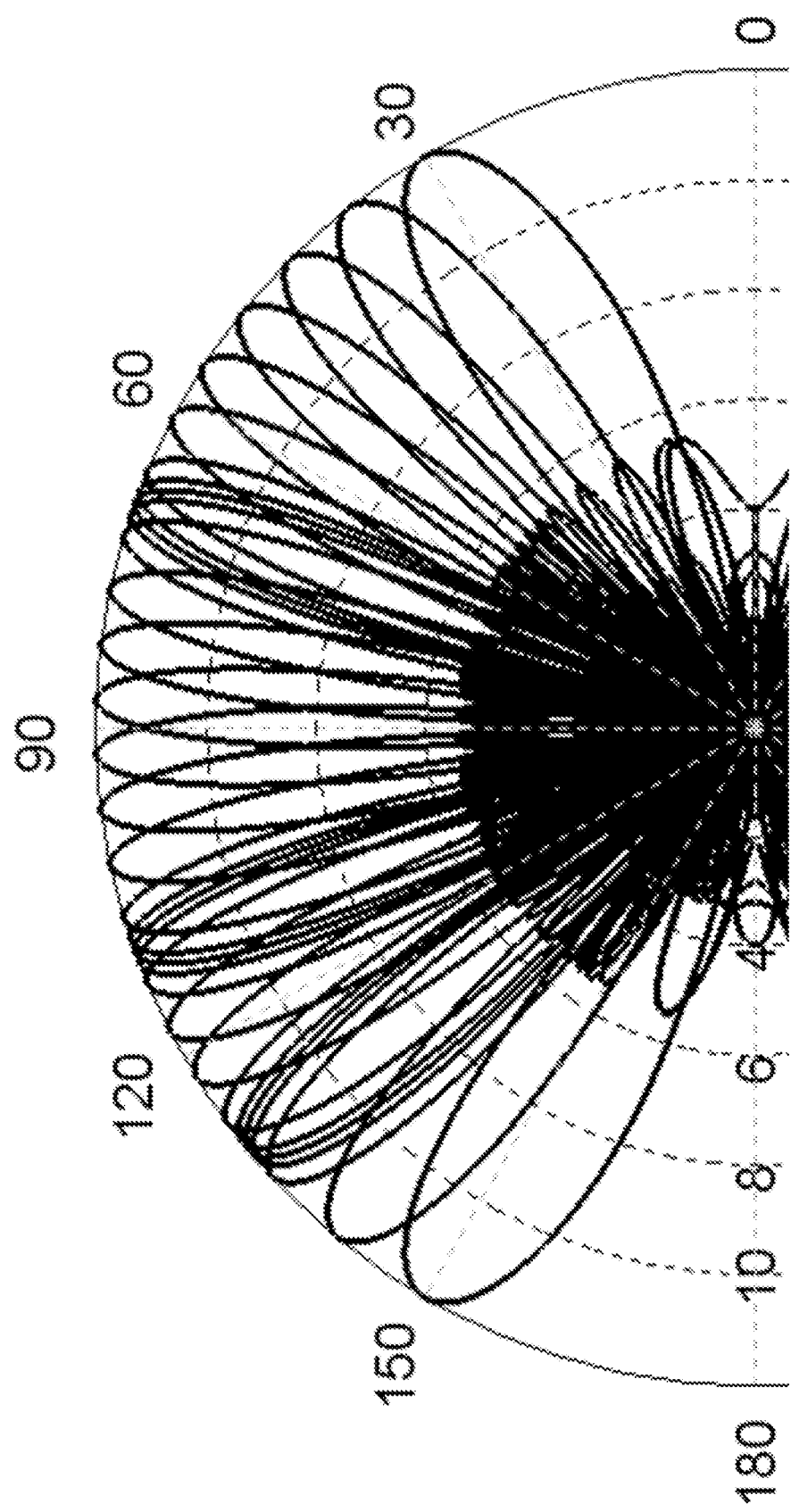
FIG. 11 is a diagram showing in polar coordinates, an array factor of the beam table after rearranging the beams in non-optimized regions after the optimization according to the second example.

As shown in FIGS. 10 and 11, according to the second example, in the vicinity of the desired three directions, the beams are densely arranged, the deterioration of the gain is slight, and the deep valley of the gain can be also improved regarding the non-optimized region as a results of the leveling adjustment.

According to the second example, since the optimization of the beam table for the three directions is performed as described above, the arrangement can be realized such that the valley of the gain is shallow in vicinity of the optimization direction, for example, as shown in FIG. 10. As a result, according to the second example, the valley of the gain is shallow in the vicinity of the optimization direction. Therefore, it is possible to prevent the MCS having a low communication speed from being selected due to the deterioration of the communication quality of the user who installs the wireless communication device in the valley direction of the beam, and to reduce the difference in the communication speed between the users. In addition, according to the second example, since the optimized beam table is rearranged after the optimization, the difference between the valleys of the gain in the non-optimization region is reduced as shown in FIG. 10 with respect to FIG. 9. As a result, according to the second example, the difference between the valleys of the gain in the non-optimized region is reduced. Therefore, it is possible to prevent the MCS having a low communication speed from being selected due to the deterioration of the communication quality of the user who installs the wireless communication device in the valley direction of the beam, and to reduce the difference in the communication speed between the users even when the communication with a wireless communication device in other directions is started such that the number of wireless communication devices of the communication partner increases after the determination of the optimization direction.

Third Example

In the third example, an example of a process in which the wireless communication device 2 dynamically constitutes an optimized beam table for four directions (52, 70, 110, and 130 degrees) will be described with reference to FIG. 5.

In this case, the control system 223 determines to generate an optimized beam table optimized in the four directions of 52, 70, 110, and 130 degrees (Step S1).

Next, the control system 223 densely arranges the beams in desired directions, that is, 52, 70, 110, and 130 degrees and in the vicinity thereof (Steps S2 to S4).

In the present example, regarding beams of 52, 70, 110, and 130 degrees, the control system 223 selects the beams of 52.0, 70.0, 110.0, and 130.0 degrees from the AWVs as a selection source, and arranges them in the optimized beam table (Step S2). Next, the control system 223 arranges the second and third first adjacent beams so as to sandwich each of the beams at 52.0 70.0, 110.0, and 130.0 degrees (Step S3).

The control system 223 arranges the fourth and fifth second adjacent beams so as to sandwich three beams including the second first adjacent beam and the third first adjacent beam with respect to 52, 70, 110, and 130 degrees, respectively (Step S4).

Through the processes of Steps S2 to S4, the control system 223 makes the angular intervals between the beams dense in the vicinity of the 52-degree direction, in the vicinity of the 70-degree direction, in the vicinity of the 110-degree direction, and in the vicinity of the 130-degree direction, respectively.

Next, the control system 223 determines the number of beams to be arranged in each non-optimized region, and arranges the beams (Step S5).

Figure 12:
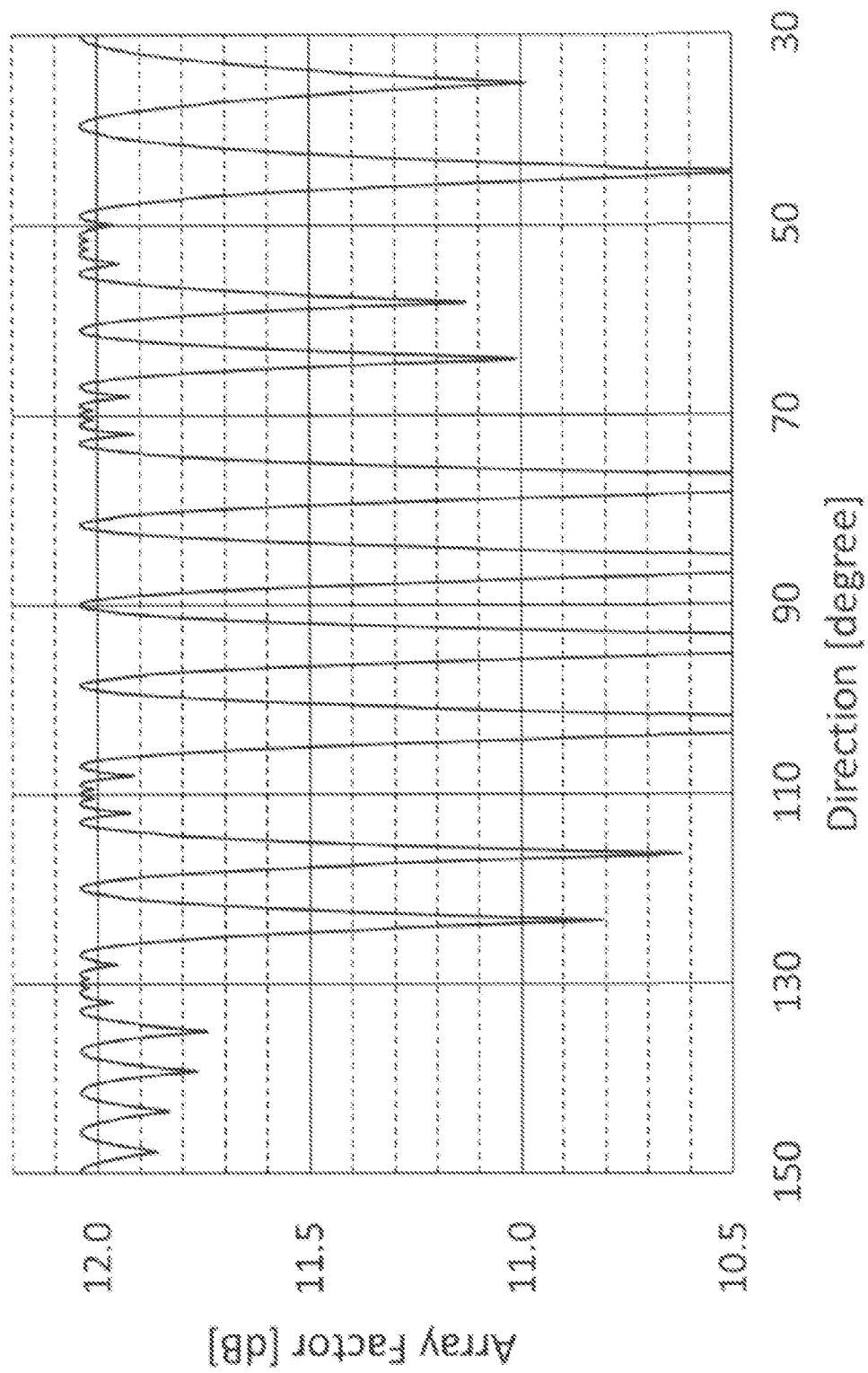
FIG. 12 is a diagram showing an array factor of the beam table before rearranging the beams in non-optimized regions after the optimization according to the third example.

FIG. 12 shows an example of the optimized beam table at this stage. FIG. 12 is a diagram showing an array factor of the beam table before rearranging the beams in non-optimized regions after the optimization according to the third example. The horizontal and vertical axes of FIG. 12 are the same as those in FIG. 4.

Next, in each non-optimized region, the control system 223 adjusts the beam direction such that the beam interval becomes narrower for the directions in which the gain valley is deep and the beam interval becomes wider for the directions in which the gain valley is shallow to perform the replacement of the set of AWVs to be selected. The control system 223 uses the difference between the maximum and the minimum of the valley of the gain in the non-optimized region as an index, and ends the adjustment of the non-optimized region when the improvement does not occur even after the replacement (Step S6).

Next, after the above-described processes are completed, the control system 223 performs operations so as to compare the deepest valley of the gain of each non-optimized region, reduce one beam from the non-optimized region with a shallow gain valley, and increase one beam to the non-optimized region with a deep gain valley (Step S7).

The control system 223 again arranges the beams with an approximately uniform angular interval in an angular range of each non-optimized region based on the increased or decreased number of beams.

The control system 223 repeats Steps S6 and S7. When the difference between a gain of the shallowest valley and a gain of the deepest valley in all the non-optimized regions is minimized, the arrangement at the moment is employed, and the rearrangement of the non-optimized region is completed. The optimized beam tables finally obtained after the process is completed is shown in FIGS. 13 and 14.

Figure 13:
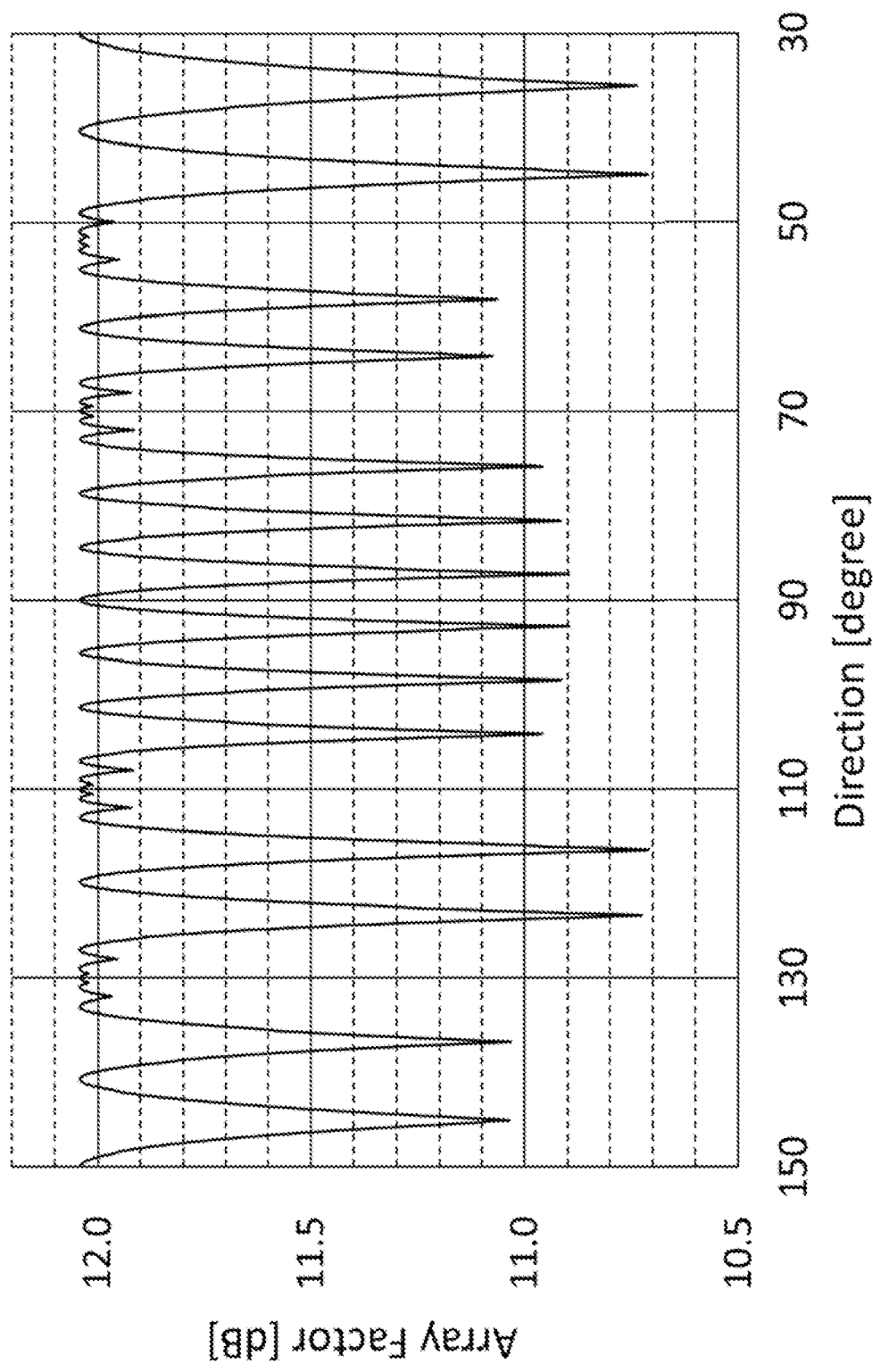
FIG. 13 is a diagram showing an array factor of the beam table after rearranging the beams in non-optimized regions after the optimization according to the third example.

FIG. 13 is a diagram showing an array factor of the beam table after rearranging the beams in non-optimized regions after the optimization according to the third example. The horizontal and vertical axes of FIG. 13 are the same as those in FIG. 4. FIG. 14 is a diagram showing in polar coordinates, an array factor of the beam table after rearranging the beams in non-optimized regions after the optimization according to the third example. The coordinates of FIG. 14 are the same as those in FIG. 3.

Figure 14:
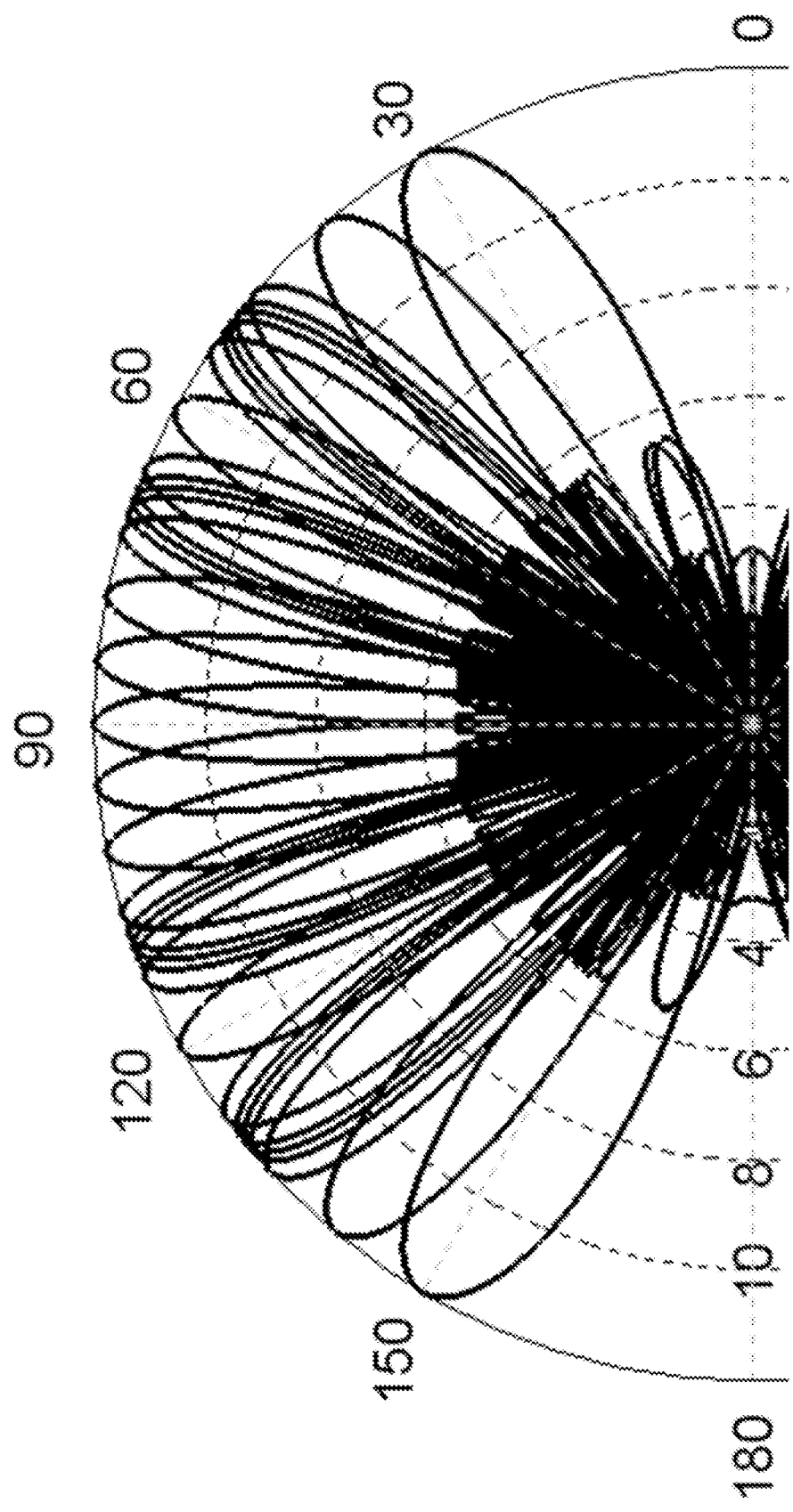
FIG. 14 is a diagram showing in polar coordinates, an array factor of the beam table after rearranging the beams in non-optimized regions after the optimization according to the third example.

As shown in FIGS. 13 and 14, according to the third example, in the vicinity of the desired four directions, the beams are densely arranged, the deterioration of the gain is slight, and the deep valley of the gain can be also improved regarding the non-optimized region as a results of the leveling adjustment.

According to the third example, since the optimization of the optimized beam table for the four directions is performed as described above, the arrangement can be realized such that the valley of the gain is shallow in vicinity of the optimization direction, for example, as shown in FIG. 13. As a result, according to the third example, the valley of the gain is shallow in the vicinity of the optimization direction. Therefore, it is possible to prevent the MCS having a low communication speed from being selected due to the deterioration of the communication quality of the user who installs the wireless communication device in the valley direction of the beam, and to reduce the difference in the communication speed between the users. In addition, according to the third example, since the optimized beam table is rearranged after the optimization, the difference between the valleys of the gain in the non-optimization region is reduced as shown in FIG. 13 with respect to FIG. 12. As a result, according to the third example, the difference between the valleys of the gain in the non-optimized region is reduced. Therefore, it is possible to prevent the MCS having a low communication speed from being selected due to the deterioration of the communication quality of the user who installs the wireless communication device in the valley direction of the beam, and to reduce the difference in the communication speed between the users even when the communication with a wireless communication device in other directions is started such that the number of wireless communication devices of the communication partner increases after the determination of the optimization direction.

Fourth Example

In the fourth example, sixty-one beams are arranged at intervals of 2 degrees as a standard beam table to cover an angular range of 120 degrees from the 30-degree direction to the 150-degree direction. An example of generating an optimized beam table by optimizing the standard beam table with respect to five directions of 36, 60, 90, 106, and 128 degrees will be described with reference to FIG. 5.

Figure 15:
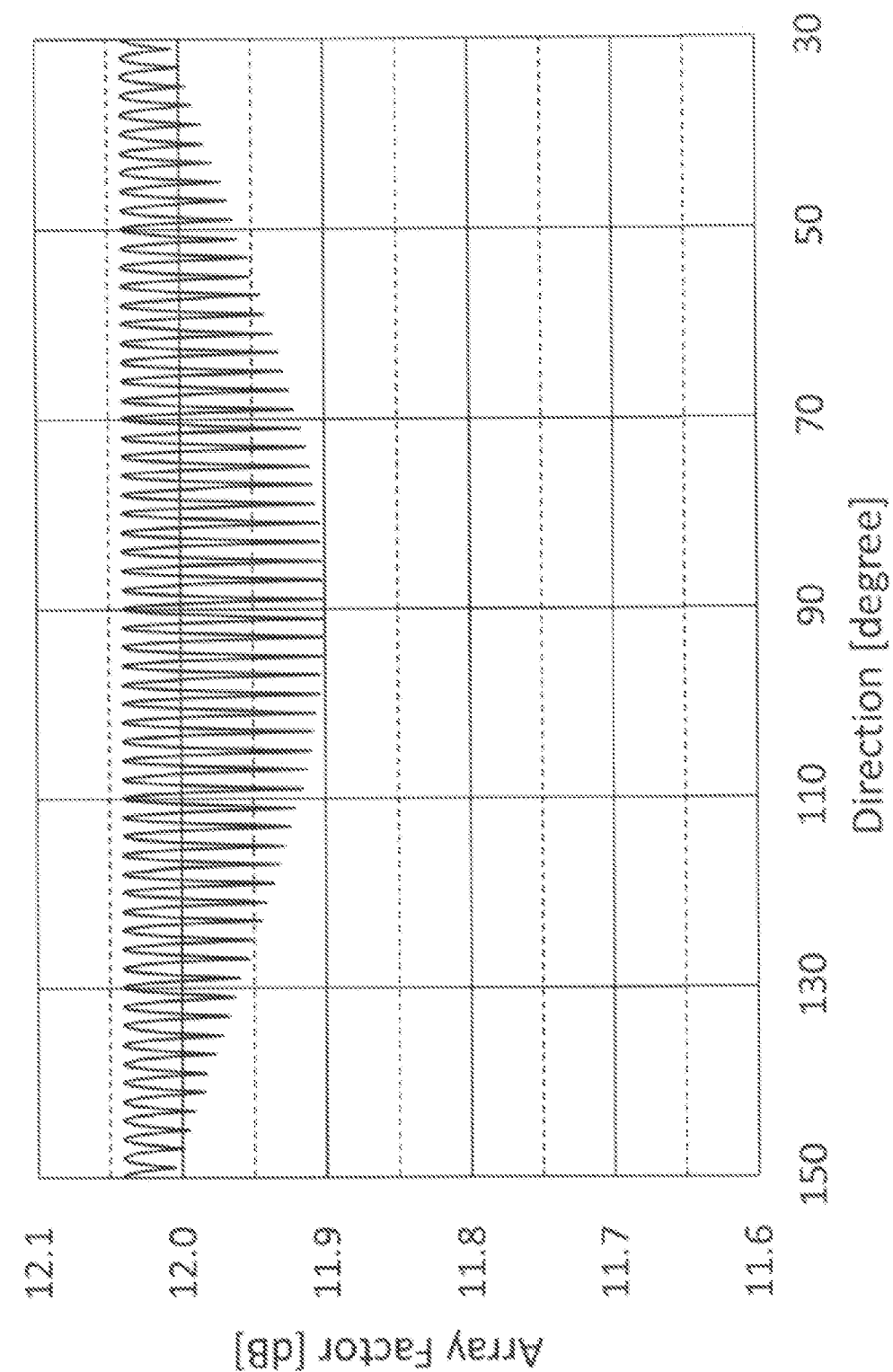
FIG. 15 is a diagram showing a standard beam table in the fourth example.
Figure 16:
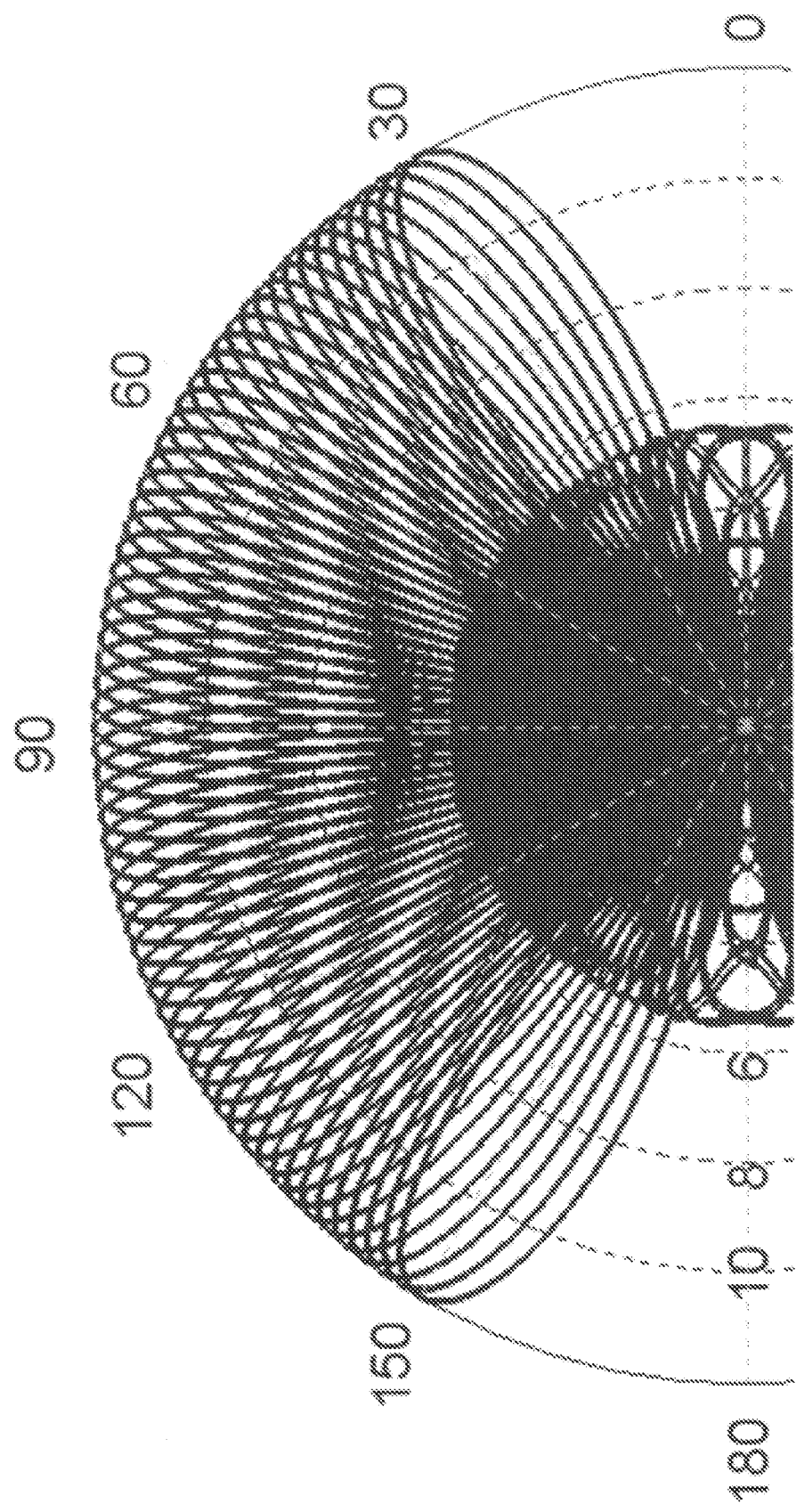
FIG. 16 is a diagram showing in polar coordinates, an array factor in the standard beam table of the fourth example.

FIG. 15 is a diagram showing a standard beam table in the fourth example. In FIG. 15, the horizontal axis is a direction [degree] and the vertical axis is an array factor [dB]. FIG. 16 is a diagram showing in polar coordinates, an array factor in the standard beam table of the fourth example. FIG. 15 shows that the deterioration of the gain in the valley is smaller than that of FIG. 4 of the first example including thirty-one beams. However, in FIG. 15, there is a difference in gain between the beam direction and the valley, and there is a possibility that the MCS is deteriorated due to the difference.

In this case, the control system 223 determines to generate an optimized beam table optimized in the five directions of 36, 60, 90, 106, and 128 degrees (Step S1).

Next, the control system 223 densely arranges the beams in desired directions, that is, 36, 60, 90, 106, and 128 degrees and the vicinity thereof (Steps S2 to S4).

In the present example, regarding beams of 36, 60, 90, 106, and 128 degrees, the control system 223 selects the beams of 36.0, 60.0, 90.0, 106.0, and 128.0 degrees from the AWVs as a selection source, and arranges them in the optimized beam table (Step S2). Next, the control system 223 arranges the second and third first adjacent beams so as to sandwich each of the beams at 36.0, 60.0, 90.0, 106.0, and 128.0 degrees (Step S3).

The control system 223 arranges the fourth and fifth second adjacent beams so as to sandwich three beams including the second first adjacent beam and the third first adjacent beam with respect to 36, 60, 90, 106, and 128 degrees, respectively (Step S4).

Through the processes of Steps S2 to S4, the control system 223 makes the angular intervals between the beams dense in the vicinity of the 36-degree direction, in the vicinity of the 60-degree direction, in the vicinity of the 90-degree direction, in the vicinity of the 106-degree direction, and in the vicinity of the 128-degree direction, respectively.

Figure 17:
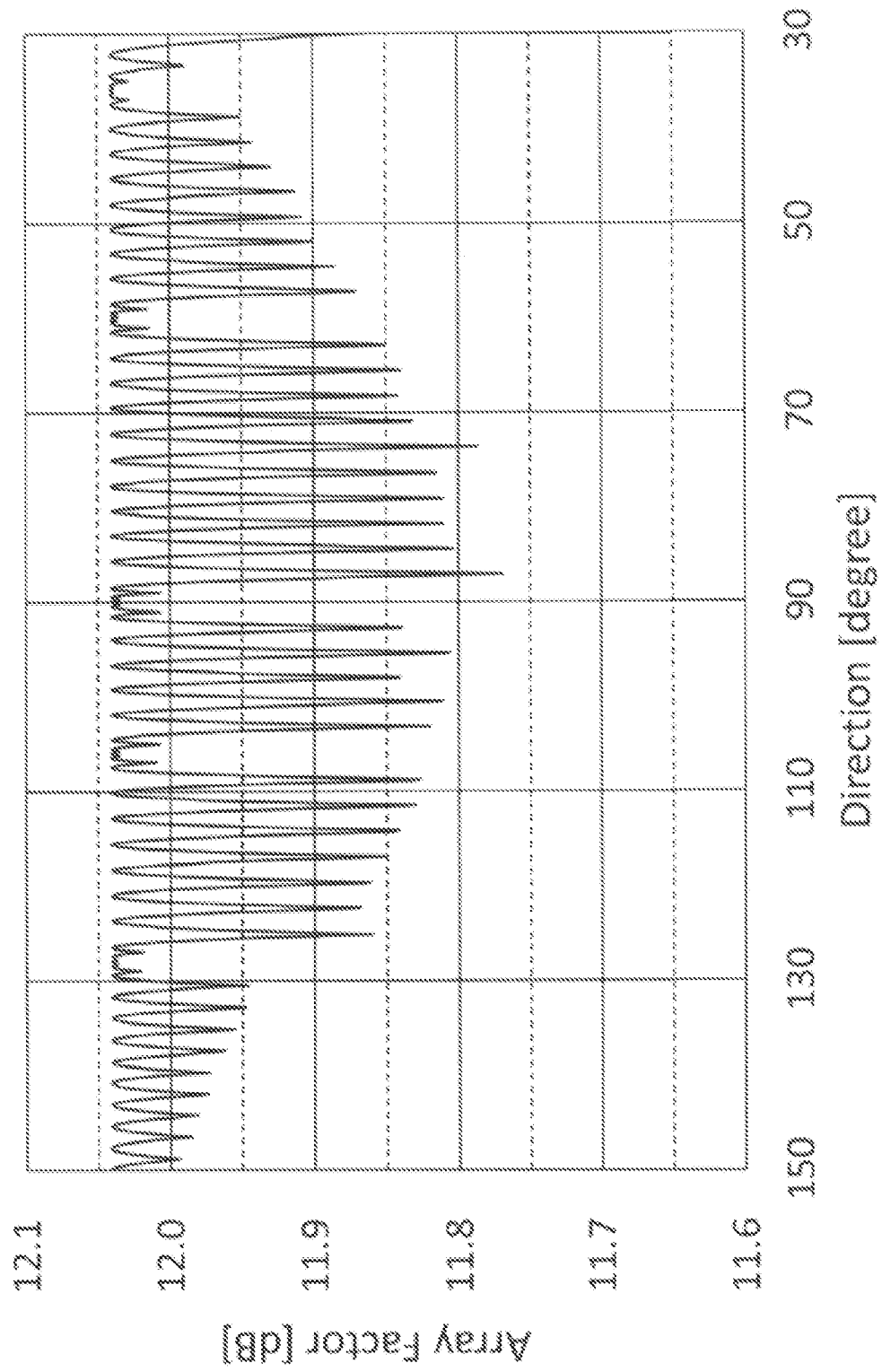
FIG. 17 is a diagram showing an array factor of the beam table before rearranging the beams in non-optimized regions after the optimization according to the fourth example.

Next, the control system 223 determines the number of beams to be arranged in each non-optimized region, and arranges the beams (Step S5). FIG. 17 shows an example of the optimized beam table at this stage. FIG. 17 is a diagram showing an array factor of the beam table before rearranging the beams in non-optimized regions after the optimization according to the fourth example. The horizontal and vertical axes of FIG. 17 are the same as those in FIG. 15. In the fourth example, for example, the first angular interval is set to 0.5 degrees, which is ¼ of 2 degrees, which is the angular interval of the standard beam table. In addition, in the fourth example, the second angular interval is set to 1.0 degree smaller than 2 degrees and wider than 0.5 degrees of the first angular interval. The two angular intervals, which are an angular interval between the second first adjacent beam and the beam of the optimization direction and an angular interval between the beam of the optimization direction and the third first adjacent beam, are the first angular interval. The two angular intervals, which are an angular interval between the fourth second adjacent beam adjacent to the second first adjacent beam and the second first adjacent beam, and an angular interval between the fifth second adjacent beam adjacent to the third first adjacent beam and the third first adjacent beam, are the second angular interval.

Next, in each non-optimized region, the control system 223 adjusts the beam direction such that the beam interval becomes narrower for the directions in which the gain valley is deep and the beam interval becomes wider for the directions in which the gain valley is shallow to perform the replacement of the set of AWVs to be selected. The control system 223 uses the difference between the maximum and the minimum of the valley of the gain in the non-optimized region as an index, and ends the adjustment of the non-optimized region when the improvement does not occur even after the replacement (Step S6).

Next, after the above-described processes are completed, the control system 223 performs operations so as to compare the deepest valley of the gain of each non-optimized region, reduce one beam from the non-optimized region with a shallow gain valley, and increase one beam to the non-optimized region with a deep gain valley (Step S7).

The control system 223 again arranges the beams with an approximately uniform angular interval in an angular range of each non-optimized region based on the increased or decreased number of beams.

The control system 223 repeats Steps S6 and S7. When the difference between a gain of the shallowest valley and a gain of the deepest valley in all the non-optimized regions is minimized, the arrangement at the moment is employed, and the rearrangement of the non-optimized region is completed. The optimized beam tables finally obtained after the process is completed is shown in FIGS. 18 and 19.

Figure 18:
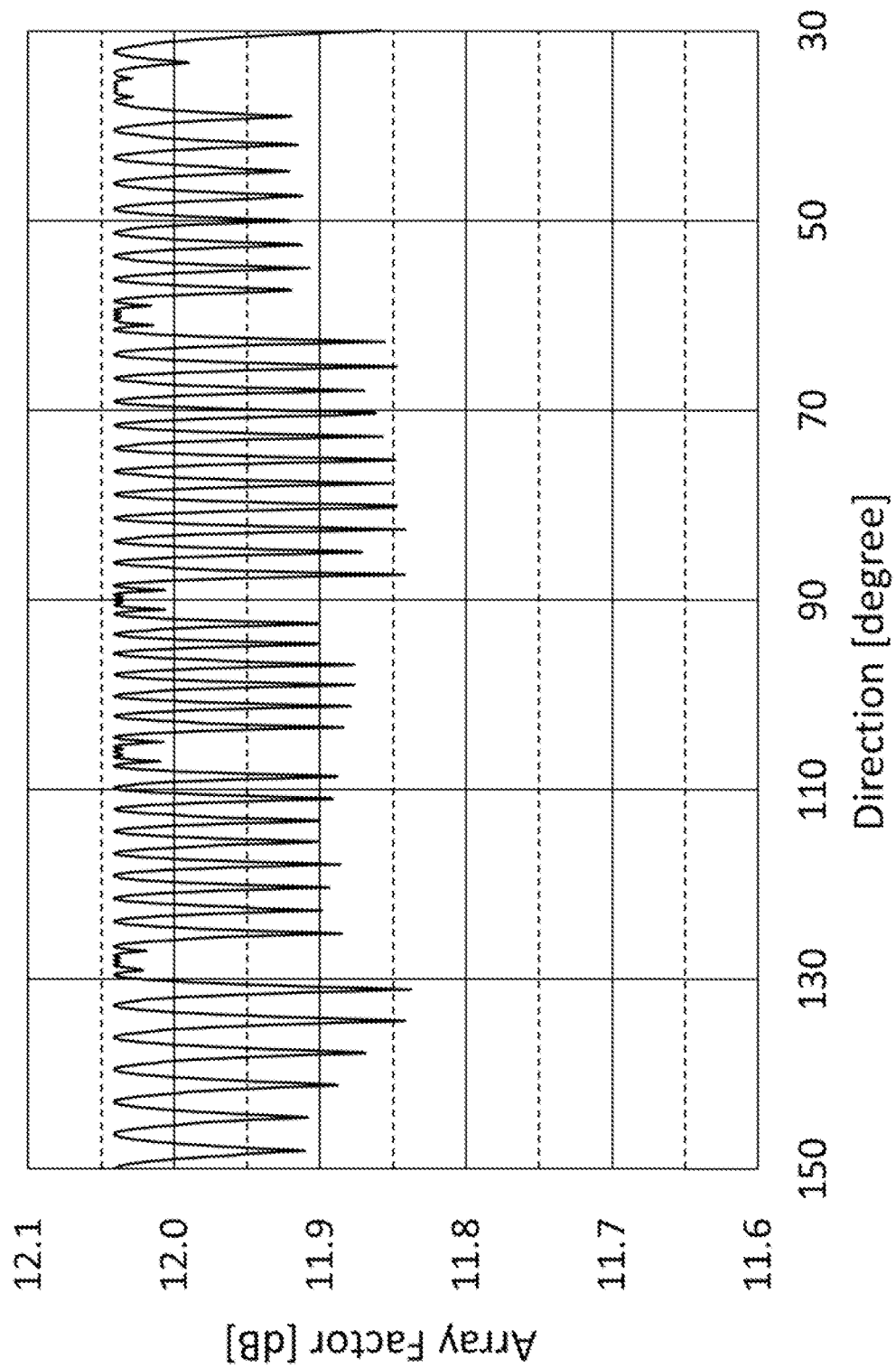
FIG. 18 is a diagram showing an array factor of the beam table after rearranging the beams in non-optimized regions after the optimization according to the fourth example.

FIG. 18 is a diagram showing an array factor of the beam table after rearranging the beams in non-optimized regions after the optimization according to the fourth example. The horizontal and vertical axes of FIG. 18 are the same as those in FIG. 15. FIG. 19 is a diagram showing in polar coordinates, an array factor of the beam table after rearranging the beams in non-optimized regions after the optimization according to the fourth example. The coordinates of FIG. 19 are the same as those in FIG. 16.

Figure 19:
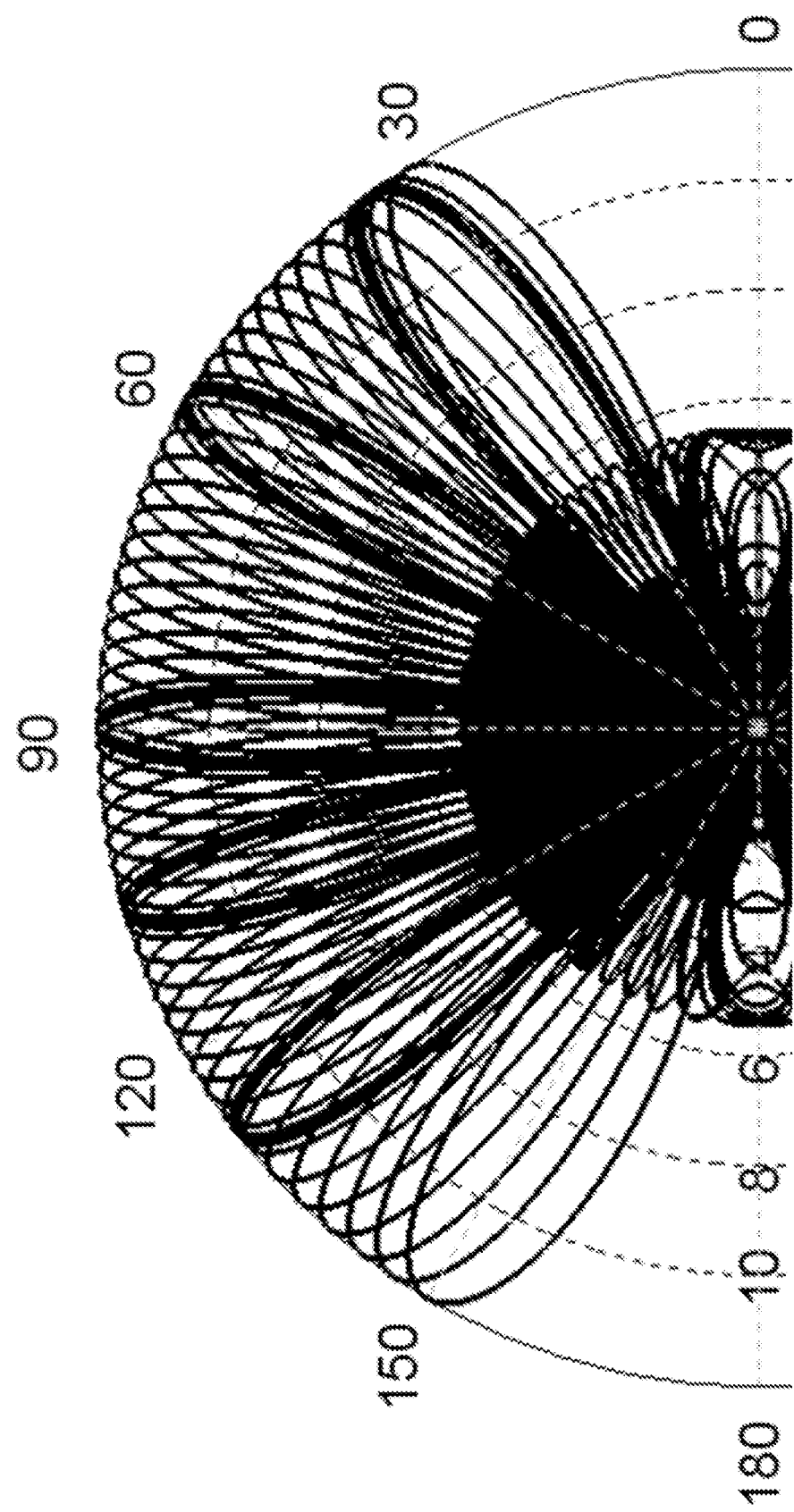
FIG. 19 is a diagram showing in polar coordinates, an array factor of the beam table after rearranging the beams in non-optimized regions after the optimization according to the fourth example.

As shown in FIGS. 18 and 19, according to the fourth example, in the vicinity of the desired five directions, the beams are densely arranged, there is almost no gain deterioration, and the deep valley of the gain can be also improved regarding the non-optimized region as a results of the leveling adjustment.

According to the fourth example, since the optimization of the optimized beam table for the five directions is performed as described above, the arrangement can be realized such that the valley of the gain is shallow in vicinity of the optimization direction, for example, as shown in FIG. 18. As a result, according to the fourth example, the valley of the gain is shallow in the vicinity of the optimization direction. Therefore, it is possible to prevent the MCS having a low communication speed from being selected due to the deterioration of the communication quality of the user who installs the wireless communication device in the valley direction of the beam, and to reduce the difference in the communication speed between the users. In addition, according to the fourth example, since the optimized beam table is rearranged after the optimization, the difference between the valleys of the gain in the non-optimization region is reduced as shown in FIG. 18 with respect to FIG. 17. As a result, according to the fourth example, the difference between the valleys of the gain in the non-optimized region is reduced. Therefore, it is possible to prevent the MCS having a low communication speed from being selected due to the deterioration of the communication quality of the user who installs the wireless communication device in the valley direction of the beam, and to reduce the difference in the communication speed between the users even when the communication with a wireless communication device in other directions is started such that the number of wireless communication devices of the communication partner increases after the determination of the optimization direction.

Fifth Example

In the fifth example, sixty-one beams cover an angular range of 120 degrees from the 30-degree direction to the 150-degree direction as a standard beam table. An example of generating an optimized beam table by optimizing the standard beam table with respect to six directions of 36, 60, 90, 106, 128, and 140 degrees will be described with reference to FIG. 5.

In this case, the control system 223 determines to generate an optimized beam table optimized in the fix directions of 36, 60, 90, 106, 128, and 140 degrees and the vicinity thereof (Step S1).

Next, the control system 223 densely arranges the beams in desired directions, that is, 36, 60, 90, 106, 128, and 140 degrees (Steps S2 to S4).

In the present example, regarding beams of 36, 60, 90, 106, 128, and 140 degrees, the control system 223 selects the beams of 36.0, 60.0, 90.0, 106.0, 128.0, and 140.0 degrees from the AWVs as a selection source, and arranges them in the optimized beam table (Step S2). Next, the control system 223 arranges the second and third first adjacent beams so as to sandwich each of the beams at 36.0, 60.0, 90.0, 106.0, 128.0, and 140.0 degrees (Step S3).

The control system 223 arranges the fourth and fifth second adjacent beams so as to sandwich three beams including the second first adjacent beam and the third first adjacent beam with respect to 36, 60, 90, 106, 128, and 140 degrees, respectively (Step S4).

Through the processes of Steps S2 to S4, the control system 223 makes the angular intervals between the beams dense in the vicinity of the 36-degree direction, in the vicinity of the 60-degree direction, in the vicinity of the 90-degree direction, in the vicinity of the 106-degree direction, in the vicinity of the 128-degree direction, and in the vicinity of the 140-degree direction, respectively.

Next, the control system 223 determines the number of beams to be arranged in each non-optimized region, and arranges the beams (Step S5).

Figure 20:
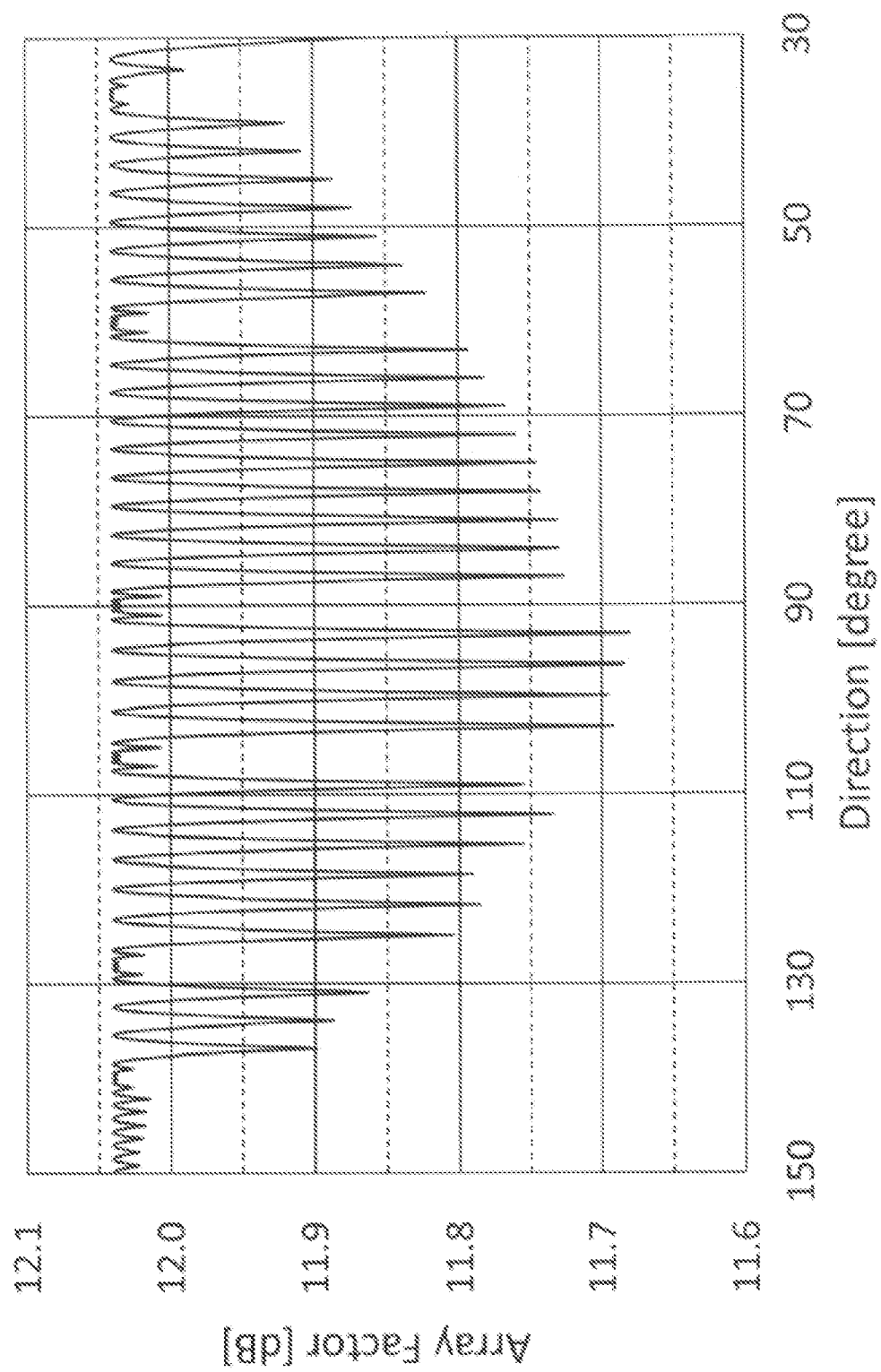
FIG. 20 is a diagram showing an array factor of the beam table before rearranging the beams in non-optimized regions after the optimization according to the fifth example.

FIG. 20 shows an example of the optimized beam table at this stage. FIG. 20 is a diagram showing an array factor of the beam table before rearranging the beams in non-optimized regions after the optimization according to the fifth example. The horizontal and vertical axes of FIG. 20 are the same as those in FIG. 15.

Next, in each non-optimized region, the control system 223 adjusts the beam direction such that the beam interval becomes narrower for the directions in which the gain valley is deep and the beam interval becomes wider for the directions in which the gain valley is shallow to perform the replacement of the set of AWVs to be selected. The control system 223 uses the difference between the maximum and the minimum of the valley of the gain in the non-optimized region as an index, and ends the adjustment of the region when the improvement does not occur even after the replacement (Step S6).

Next, after the above-described processes are completed, the control system 223 performs operations so as to compare the deepest valley of the gain of each non-optimized region, reduce one beam from the non-optimized region with a shallow gain valley, and increase one beam to the non-optimized region with a deep gain valley (Step S7).

The control system 223 again arranges the beams with an approximately uniform angular interval in an angular range of each non-optimized region based on the increased or decreased number of beams.

The control system 223 repeats Steps S6 and S7. When the difference between a gain of the shallowest valley and a gain of the deepest valley in all the non-optimized regions is minimized, the arrangement at the moment is employed, and the rearrangement of the non-optimized region is completed. The optimized beam tables finally obtained after the process is completed is shown in FIGS. 21 and 22.

Figure 21:
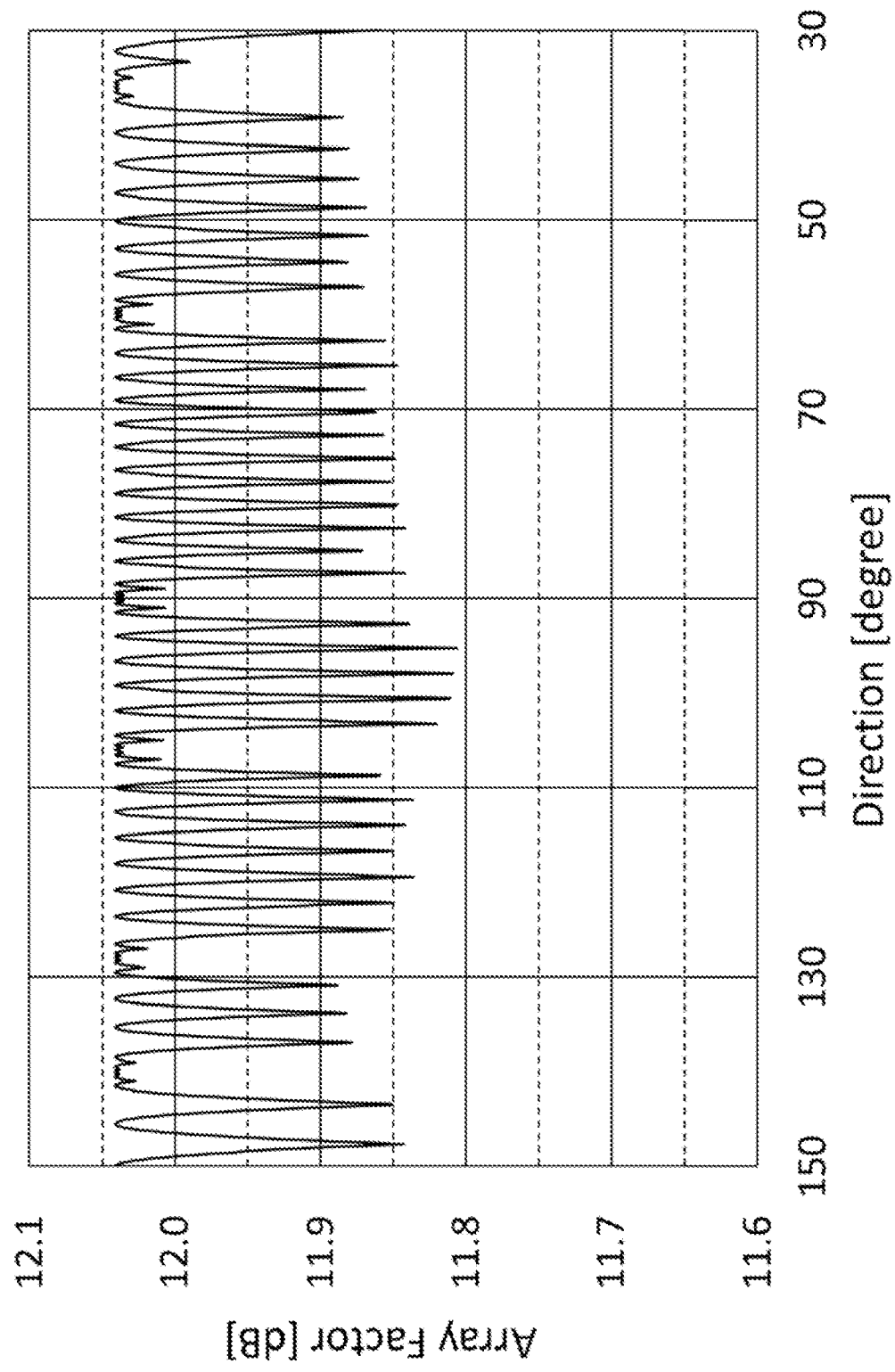
FIG. 21 is a diagram showing an array factor of the beam table after rearranging the beams in non-optimized regions after the optimization according to the fifth example.

FIG. 21 is a diagram showing an array factor of the beam table after rearranging the beams in non-optimized regions after the optimization according to the fifth example. The horizontal and vertical axes of FIG. 21 are the same as those in FIG. 15. FIG. 22 is a diagram showing in polar coordinates, an array factor of the beam table after rearranging the beams in non-optimized regions after the optimization according to the fifth example. The coordinates of FIG. 22 are the same as those in FIG. 16.

Figure 22:
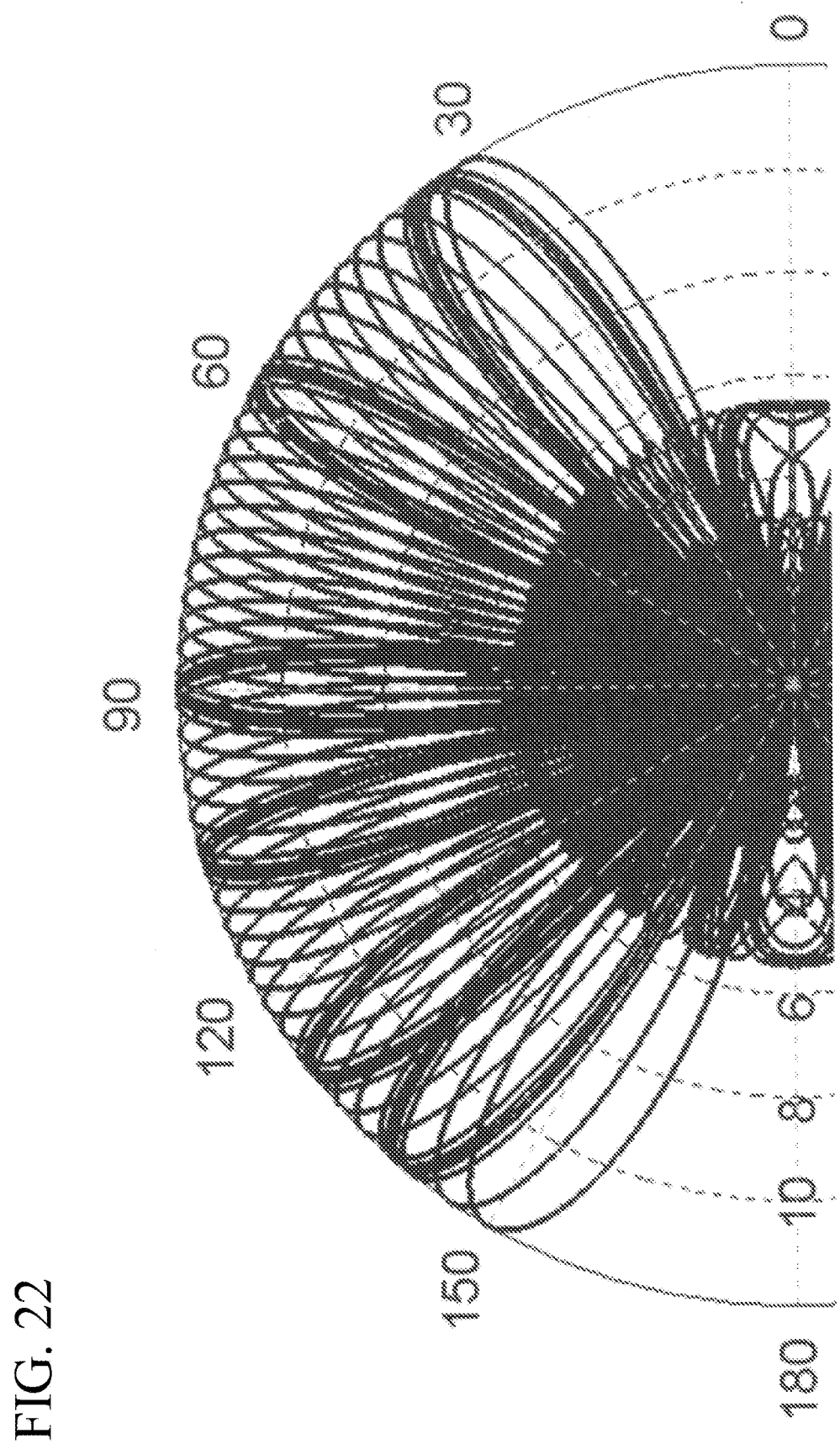
FIG. 22 is a diagram showing in polar coordinates, an array factor of the beam table after rearranging the beams in non-optimized regions after the optimization according to the fifth example.

As shown in FIGS. 21 and 22, according to the fifth example, in the vicinity of the desired six directions, the beams are densely arranged, there is almost no gain deterioration, and the deep valley of the gain can be also improved regarding the non-optimized region as a results of the leveling adjustment.

According to the fifth example, since the optimization of the optimized beam table for the six directions is performed as described above, the arrangement can be realized such that the valley of the gain is shallow in vicinity of the optimization direction, for example, as shown in FIG. 21. As a result, according to the fifth example, the valley of the gain is shallow in the vicinity of the optimization direction. Therefore, it is possible to prevent the MCS having a low communication speed from being selected due to the deterioration of the communication quality of the user who installs the wireless communication device in the valley direction of the beam, and to reduce the difference in the communication speed between the users.

As described above, in the present embodiment, a beam table in which the angular intervals between the beams are uniform is used, and a beam table optimized for a specific direction is additionally prepared by dynamic means and the beam table is appropriately applied.

In addition, in the present embodiment, a group of AWV sets as a selection source for constituting the optimized beam table is held.

Furthermore, in the present embodiment, the target direction to be optimized is not limited to one direction, and a beam table for a plurality of directions such as two directions or three directions or the like is prepared in association with the number of users.

Here, when the direction to be optimized is multi-directional, an enormous amount of data is required if an optimized beam table is prepared in advance. Alternatively, when it is intended to cope with a limited data amount, the pattern of the optimized beam table that can be prepared is limited.

For this reason, in the present embodiment, when preparing the optimized beam table, a group of AWV sets as a selection source is prepared in advance, and an optimized beam table is generated on the spot by selecting and combining appropriate AWV sets from the group of AWV sets as a selection source.

In each of the above-described examples, when rearranging the beam arrangement, the valley between a beam at the edge of the non-optimized region and a beam at the edge of the optimized region could also be investigated.

As described above, according to each example, since a beam table optimized for the direction in which the wireless communication device of the communication partner exists is generated, the beams are densely arranged in the direction where the wireless communication device of the communication partner exists. As a result, according to each example, each wireless communication device of the communication partner can perform stable communication with high-speed MCS with good communication quality. Therefore, the difference of the wireless signal quality between the users can be reduced.

In addition, according to the fifth example, since the optimized beam table is rearranged after the optimization, the difference between the valleys of the gain in the non-optimization region is reduced as shown in FIG. 21 with respect to FIG. 20. As a result, according to the fifth example, the difference between the valleys of the gain in the non-optimized region is reduced. Therefore, it is possible to prevent the MCS having a low communication speed from being selected due to the deterioration of the communication quality of the user who installs the wireless communication device in the valley direction of the beam, and to reduce the difference in the communication speed between the users even when the communication with a wireless communication device in other directions is started such that the number of wireless communication devices of the communication partner increases after the determination of the optimization direction.

As described above, the embodiments for carrying out the present invention have been described using the embodiments. However, the present invention is not limited to these embodiments, and various modifications and substitutions can be made without departing from the scope of the present invention.

What is claimed is:

1. A wireless communication device comprising:
   a storage that stores a standard beam table, which is a table constituted by a plurality of antenna weight vector sets corresponding to beam patterns in which beam angular intervals between beams are uniform; and
   a controller that determines a direction, in which a communication partner's wireless communication device exists, as a direction to be optimized, generates an optimized beam table by changing the angular intervals between the beams of the standard beam table, with respect to the direction to be optimized, to become narrower than the uniform angular intervals, and performs a communication with the communication partner's wireless communication device using the optimized beam table,
   wherein the controller determines a beam to be set in a vicinity of the direction to be optimized, and selecting and arranging an antenna weight vector set corresponding to the beam pattern of the determined beam to be set in the vicinity of the direction to be optimized.

2. The wireless communication device according to claim 1, wherein:

the storage stores the plurality of antenna weight vector sets; and the controller generates the optimized beam table such that
selecting an antenna weight vector set corresponding to a beam pattern of the direction to be optimized and arranging the antenna weights vector set to be selected,
determining a beam to be set to a non-optimized region excluding the direction to be optimized and the vicinity thereof, and selecting and arranging an antenna weight vector set corresponding to the beam pattern of the beam to be set in the non-optimized region.

3. The wireless communication device according to claim 2, wherein
when the controller determines the beam to be set in a vicinity of the direction to be optimized, and selects and arranges the antenna weight vector set corresponding to the beam pattern of the determined beam to be set in the vicinity of the direction to be optimized,
the controller determines an angular interval between each of two first adjacent beams adjacent to the beam in the direction to be optimized and the beam in the direction to be optimized as a first angular interval, and selects and arranges an antenna weight vector set for the beam pattern of the first adjacent beams corresponding to the determined first angular interval, and
the first angular interval is ½ or less of an angular interval between beams of the standard beam table.

4. The wireless communication device according to claim 3, wherein
the controller determines an angular interval between two second adjacent beams each adjacent to the first adjacent beam and each of the first adjacent beam as a second angular interval, and selects and arranges an antenna weight vector set for the beam pattern of the second adjacent beams corresponding to the determined second angular interval, and
the second angular interval is smaller than an angular interval between the beams of the standard beam table and is larger than the first angular interval.

5. The wireless communication device according to claim 4, wherein the first angular interval is ¼ or less of the angular interval between the beams of the standard beam table, and the second angular interval is ½ or less of the angular interval between the beams of the standard beam table.

6. The wireless communication device according to claim 2, wherein
when determining a beam to be set to the non-optimized region excluding the direction to be optimized and the vicinity thereof, and selecting and arranging an antenna weight vector set corresponding to the beam pattern of the determined beam to be set in the non-optimized region,
the controller adjusts the beam arrangement so as to reduce a deterioration in a gain of valleys between the beam set in the non-optimized region and the beam adjacent to that beam.

7. The wireless communication device according to claim 6, wherein
when adjusting the beam arrangement in the non-optimized region,
the controller adjusts the angular intervals between the beams in each of the non-optimized regions to be non-uniform, and adjusts balance of a number of beams provided between the plurality of non-optimized regions.

8. The wireless communication device according to claim 7, wherein
when adjusting the balance of the number of beams,
the controller adjusts such that a difference between a gain of the shallowest valley and a gain of the deepest valley is reduced in all the non-optimized regions.

9. A wireless communication method performing a communication with a wireless communication device and a communication partner's wireless communication device using an optimized beam table, the wireless communication device comprising a storage that stores a standard beam table, which is a table constituted by a plurality of antenna weight vector sets corresponding to beam patterns in which beam angular intervals between beams are uniform,
the method comprising:
determining a direction in which the communication partner's wireless communication device exists as a direction to be optimized;
generating the optimized beam table by changing the angular intervals between the beams of the standard beam table, with respect to the direction to be optimized, to become narrower than the uniform angular intervals; and
determining a beam to be set in a vicinity of the direction to be optimized, and selecting and arranging an antenna weight vector set corresponding to the beam pattern of the determined beam to be set in the vicinity of the direction to be optimized.

10. A wireless communication device comprising:
a storage that stores a standard beam table, which is a table constituted by a plurality of antenna weight vector sets corresponding to beam patterns in which beam angular intervals between beams are uniform; and
a controller that determines a direction, in which a communication partner's wireless communication device exists, as a direction to be optimized, generates an optimized beam table by changing the angular intervals between the beams of the standard beam table, with respect to the direction to be optimized, to become narrower than the uniform angular intervals, and performs a communication with the communication partner's wireless communication device using the optimized beam table,
wherein the controller determines a beam to be set to a non-optimized region excluding the direction to be optimized and the vicinity thereof, and selecting and arranging an antenna weight vector set corresponding to the beam pattern of the beam to be set in the non-optimized region.

* * * * *